(12) United States Patent
Mercuri et al.

(10) Patent No.: US 8,986,602 B2
(45) Date of Patent: Mar. 24, 2015

(54) MULTIPLE FEEDER REACTOR FOR THE PRODUCTION OF NANO-PARTICLES OF METAL

(75) Inventors: Robert Mercuri, Seven Hills, OH (US); Michael Kasper, Illertissen (DE); Emilie Bekaert, Neu-Ulm (DE); Peter Axmann, Erbach (DE)

(73) Assignee: Directa Plus S.p.A., Lomazzo (IT)

( * ) Notice: Subject to any disclaimer, the term of this patent is extended or adjusted under 35 U.S.C. 154(b) by 345 days.

(21) Appl. No.: 13/220,392

(22) Filed: Aug. 29, 2011

(65) Prior Publication Data

US 2012/0055285 A1 Mar. 8, 2012

(30) Foreign Application Priority Data

Sep. 1, 2010 (EP) .................................... 10174975

(51) Int. Cl.
| | |
|---|---|
| B01J 19/26 | (2006.01) |
| C22B 5/20 | (2006.01) |
| B22F 9/30 | (2006.01) |
| B01J 4/00 | (2006.01) |
| B22F 1/00 | (2006.01) |
| B82Y 30/00 | (2011.01) |
| C22C 19/03 | (2006.01) |
| C22C 21/00 | (2006.01) |

(52) U.S. Cl.
CPC .................. *B22F 9/305* (2013.01); *B01J 4/002* (2013.01); *B01J 19/26* (2013.01); *B01J 2219/00006* (2013.01); *B01J 2219/00119* (2013.01); *B22F 1/0018* (2013.01); *B82Y 30/00* (2013.01); *C22B 5/20* (2013.01); *C22C 19/03* (2013.01); *C22C 21/00* (2013.01); *B22F 2999/00* (2013.01)
USPC .......................................... 266/186; 422/198

(58) Field of Classification Search
None
See application file for complete search history.

(56) References Cited

U.S. PATENT DOCUMENTS

| 1,836,732 A | 12/1931 | Schlecht et al. |
|---|---|---|
| 2,884,319 A | 4/1959 | Fabian et al. |
| 2,900,245 A | 8/1959 | Beller |

(Continued)

FOREIGN PATENT DOCUMENTS

| CN | 85100669 | 7/1986 |
|---|---|---|
| CN | 1422195 | 6/2003 |

(Continued)

OTHER PUBLICATIONS

KR2005-0015871 and machine translation, published Feb. 21, 2005, downloaded from Korean Intellectual Property Office (KIPO).*

(Continued)

*Primary Examiner* — George Wyszomierski
(74) *Attorney, Agent, or Firm* — Steinfl & Bruno, LLP

(57) ABSTRACT

The reactor is used for producing nano-particles of metal from volatile moieties in flow through mode. The reactor comprises at least a first feeder and a second feeder on one end of the vessel. The first feeder feeds the moiety in the form of an educt fluid into the reactor. This fluid is a mixture of metal moieties and a bearer fluid, entering the reactor in a vaporized state, in which the bearer fluid is used as a carrier gas. The second feeder is used as a radiator means to heat up the educt fluid within the reactor. By providing the heating fluid through the second feeder control over some environmental conditions like ambient temperature within the reactor is achieved and dissociation of the metal moieties under such controlled conditions leads to quantitative production of selected nano-particle morphologies.

46 Claims, 11 Drawing Sheets

(56) References Cited

U.S. PATENT DOCUMENTS

| | | | |
|---|---|---|---|
| 2,935,394 A | 5/1960 | Hiler | |
| 2,938,781 A | 5/1960 | Schmeckenbecher | |
| 3,068,089 A | 12/1962 | Antonsen et al. | |
| 3,075,494 A | 1/1963 | Toulmin | |
| 3,158,499 A | 11/1964 | Jenkin | |
| 3,441,408 A | 4/1969 | Schladitz | |
| 3,570,829 A | 3/1971 | Schladitz | |
| 3,900,646 A | 8/1975 | Clyde | |
| 3,955,962 A | 5/1976 | Dawihl et al. | |
| 4,084,024 A * | 4/1978 | Schumacher | 427/215 |
| 4,853,030 A | 8/1989 | Gershenson et al. | |
| 4,936,250 A * | 6/1990 | Wiseman et al. | 118/716 |
| 5,064,464 A | 11/1991 | Sawada et al. | |
| 5,085,690 A | 2/1992 | Ebenhoech et al. | |
| 5,085,885 A | 2/1992 | Foley et al. | |
| 5,130,204 A | 7/1992 | Jenkin | |
| 5,145,716 A | 9/1992 | Paserin et al. | |
| 5,358,695 A | 10/1994 | Helble et al. | |
| 5,766,305 A | 6/1998 | Watabe et al. | |
| 5,766,306 A | 6/1998 | Olli et al. | |
| 5,897,945 A | 4/1999 | Lieber et al. | |
| 5,993,569 A | 11/1999 | Simon et al. | |
| 6,409,851 B1 | 6/2002 | Sethuram et al. | |
| 6,716,525 B1 | 4/2004 | Yadav et al. | |
| 6,746,511 B2 | 6/2004 | Wasmund et al. | |
| 6,761,870 B1 | 7/2004 | Smalley et al. | |
| 7,465,430 B2 * | 12/2008 | Plischke et al. | 422/198 |
| 7,727,460 B2 | 6/2010 | Deegan et al. | |
| 7,967,891 B2 | 6/2011 | Paserin et al. | |
| 2003/0045740 A1 | 3/2003 | Druliner et al. | |
| 2003/0097903 A1 | 5/2003 | Deegan et al. | |
| 2004/0009118 A1 | 1/2004 | Phillips et al. | |
| 2004/0120882 A1 | 6/2004 | Kumar et al. | |
| 2004/0159186 A1 | 8/2004 | Matsui | |
| 2004/0178530 A1 | 9/2004 | Yadav | |
| 2005/0166934 A1 | 8/2005 | Deevi et al. | |
| 2006/0225534 A1 | 10/2006 | Swihart et al. | |
| 2007/0036911 A1 | 2/2007 | Mercuri | |
| 2007/0037700 A1 | 2/2007 | Mercuri | |
| 2007/0037701 A1 | 2/2007 | Mercuri | |
| 2007/0283782 A1 * | 12/2007 | Mercuri | 75/343 |
| 2008/0267810 A1 | 10/2008 | Curlook et al. | |
| 2010/0119429 A1 * | 5/2010 | Mullins et al. | 423/263 |
| 2010/0186550 A1 | 7/2010 | Mercuri | |
| 2010/0222212 A1 | 9/2010 | Mercuri | |
| 2010/0222214 A1 | 9/2010 | Mercuri | |

FOREIGN PATENT DOCUMENTS

| | | |
|---|---|---|
| CN | 1468677 | 1/2004 |
| CN | 200981111 | 11/2007 |
| CN | 101300070 | 11/2008 |
| CN | 101678461 | 3/2010 |
| DE | 19716882 | 10/1998 |
| EP | 0368676 | 5/1990 |
| EP | 1510274 | 8/2004 |
| RU | 2161549 | 10/2001 |
| WO | 89/07502 | 8/1989 |
| WO | 97/30797 | 8/1997 |
| WO | 98/19965 | 5/1998 |
| WO | 2004036674 | 4/2004 |
| WO | 2007/021768 | 2/2007 |
| WO | 2007/021769 | 2/2007 |
| WO | 2007/136389 | 2/2007 |
| WO | 2007021770 | 2/2007 |
| WO | 2007/142662 | 12/2007 |
| WO | 2008019268 | 2/2008 |

OTHER PUBLICATIONS

Bell, A., "The Impact of Nanoscience on Hetrogeneous Catalysis," Science, vol. 299, p. 1688, Mar. 14, 2003.

Bhaduri, S., "Catalysis with Platinum Carbonyl Clusters," Current Science, vol. 78, No. 11, Jun. 10, 2000.

Carotenuto, G. et al., "A universal method for the synthesis of metal and metal sulfide clusters embedded in polymer matrices", J. of Materials Chem., 13(12): 2927-2930 (2003).

Friend, C., "Catalysis on Surfaces," Scientific American, Apr. 1993.

Hugh, S.H., et al., "A design of a nanometer size metal particle generator: Thermal decomposition of metal carbonyls," Review of Science Instruments, vol. 70, No. 11, Nov. 1999, pp. 4366-4369.

Kirk-Othmer Encyclopedia of Chemical Technology, 4th Ed., vol. 5, pp. 123-140 (Wiley Interscience 1993).

Koch, Carl C., editor; "Nanostructured Materials: Processing, Properties and Potential Applications," Noyes Publications, 2002 (see Ch. 1, pp. 7-8, Figure 9).

Lee, G.H., et al, "Arrays of Ferromagnetic Iron and Cobalt Nanocluster Wires," J. Phys. Chem. B, vol. 106, No. 9, Mar. 7, 2002.

Pierson, H., Handbook of Chemical Vapor Depositions—Principles, Technology, and Applications, 2nd edition, Noyes Publications, 1999 pp. 52-55.

Pierson, H., Handbook of Chemical Vapor Depositions—Principles, Technology, and Applications, 2nd edition, Noyes Publications, 1999 (see Ch. 5, Section 4).

Pierson, H., Handbook of Chemical Vapor Depositions—Principles, Technology, and Applications, 2nd edition, Noyes Publications, 1999 pp. 36-67, 111-115.

Richards, R., "Synthetic Approaches to Metallic Nanomaterials," pp. 4-32 (Wiley-VCH 2005), Richards & Bonnemann.

Stuve, E., "Nanotechnology of Catalysis," Frontiers in Nanotechnology, May 13, 2003.

Sun, S. et al. "Monodisperse FePt Nanoparticles and Ferromagnetic FePt Nanocrystal Superlattices", Science, 287 (5460): 1989-1992 (2000).

Swihart, M.T. "Vapor-phase synthesis of nanoparticles," Current Opinion in Colloid and Interface Science 8 (2003) p. 127-133.

Examination Search Report for Chinese Patent Application No. 201110264226.9 filed on Sep. 1, 2011 in the name of Directa Plus S.P.A. date issued: Sep. 1, 2014.

Examination Search Report for Chinese Patent Application No. 2011102635922.2 filed on Sep. 1, 2011. date issued: Sep. 30, 2014.

Huh, S. H., et al., *A design of a nanometer size metal particle generator: Thermal decomposition of metal carbonyls*, Rev. Sci. Instr. 1999, vol. 70(11): 4366-4369.

Karmhag, R., et al., *Oxidation kinetics of nickel nanoparticles*, J. Applied Physics 2001, 89(5): 3012-3017.

\* cited by examiner

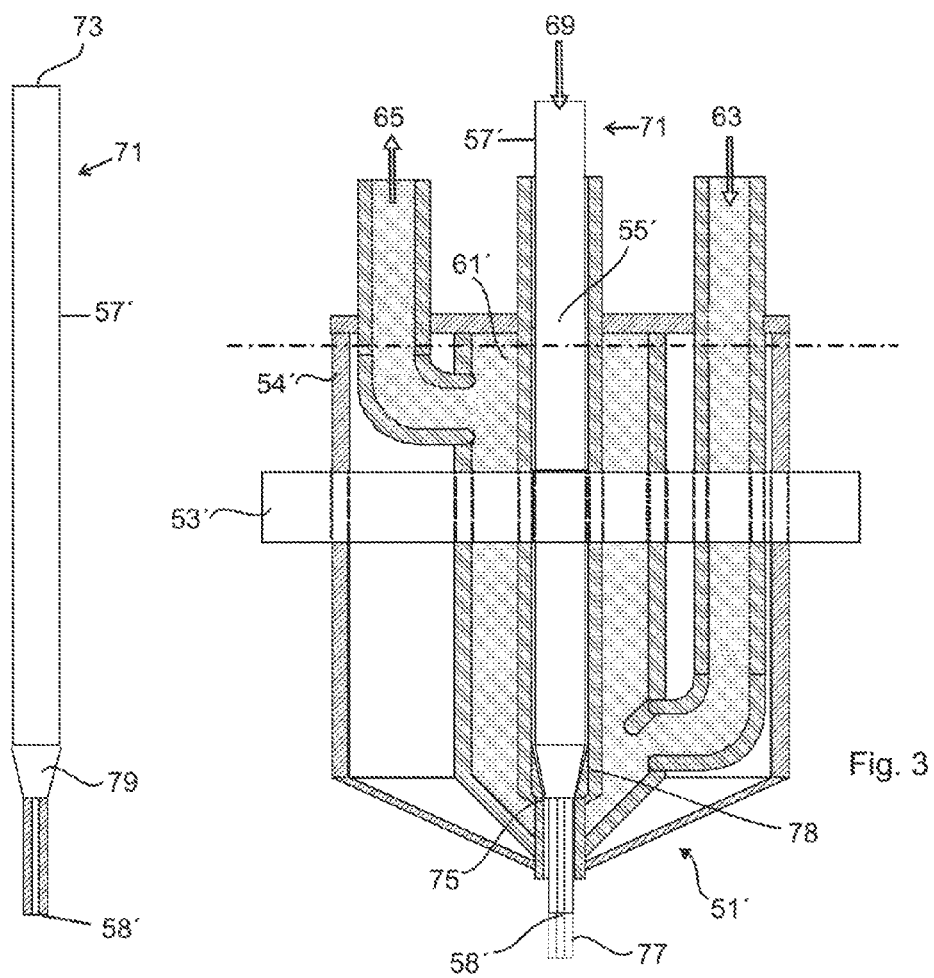
Fig. 3
Fig. 5
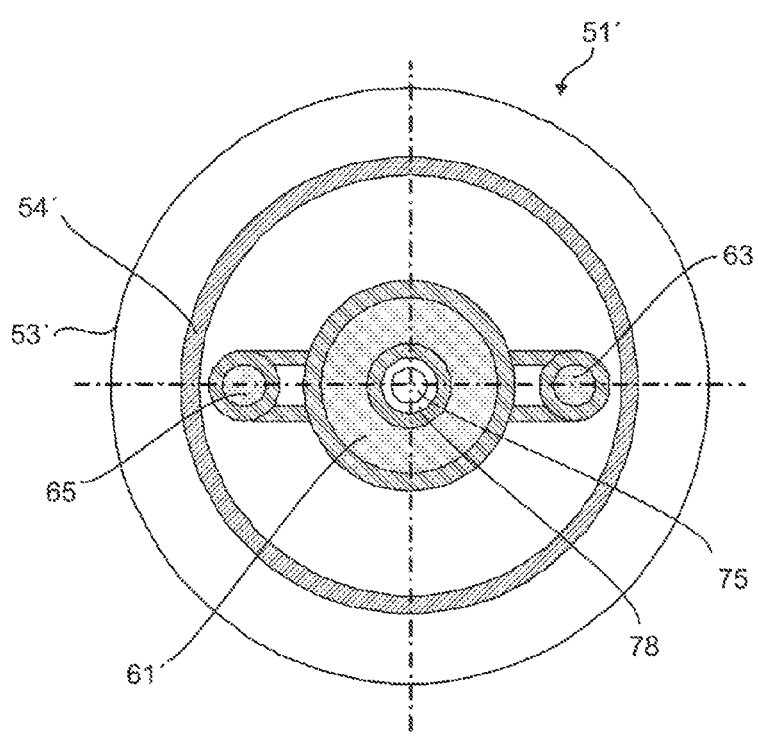
Fig. 4

MULTIPLE FEEDER REACTOR FOR THE PRODUCTION OF NANO-PARTICLES OF METAL

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: European Patent Application No. EP10174975.2, filed Sep. 1, 2010.

BACKGROUND OF THE INVENTION

1. Technical Field

This invention relates to a production facility and a production method for small particles of metal being referred to by the name nano-particles. In general, nano-particles are particles having a size on a scale of less than one thousand nanometres, more preferably less than one hundred nanometres, in at least two spatial dimensions. The facility in accordance with the present invention is particularly versatile and it can be used for the production of various nano-particle morphologies. Therefore this facility is a cost efficient means for the production of industrially required nano-particle quantities and qualities.

There are many different technologies to produce nano-scale metal particles. Among others, it is known to employ a flow-through reactor. The energy for the production of nano-scale particles has to be offered to the production process.

2. Background Art

The flow reaction process for the production of nano-scale amorphous magnetic metals described in U.S. Pat. No. 5,766,306 A (inventor: Olli et al.; assignor: The Boeing Company; filing date: Jun. 4, 1996) uses sonochemistry for the decomposition of iron carbonyl and production of nano-particles with energy and environmental conditions of collapsing bubbles. Neat iron carbonyl is injected in a reactor and after sonic treatment a surfactant is added to keep particles separate in the magnetic separation process. Microwave energy is used to melt the particles and form larger particles from aggregates.

In the article by S. H. Huh et al. Rev. Sci. Inst. 70, Nr. 11, 4366 to 4369 (1999) an electrically heated filament is used to decompose metal carbonyls and nanometre sized metal particles are collected from an experimental setup closed reactor with one gas feeder (S. H. Huh et al. FIG. 1). The article also describes formation of alloy nanometre sized particles from iron and molybdenum.

It is known from the description of FIG. 6 of U.S. Pat. No. 6,716,525 B1 (inventor: Yadav et. al.; filing date: Jun. 18, 2003) that the residence time of an in-situ formed metal fine powder can be engineered by selecting the feed location.

A different approach is taught by U.S. Pat. No. 2,900,245 A (assignor: General Aniline & Film Corp.; filing date: Jan. 24, 1957). Like it is shown in the figure of said patent, in a closed loop process with an inert gas thermally decomposition of a metal carbonyl may be controlled by controlling conditions of temperature, pressure and gas velocity. Metal particles in a dimension of 1 micron size and bigger can be produced in said closed loop process by starting off from respective metal carbonyls. Additional information how a carbonyl decomposition process may be controlled by a vessel of which its free internal space is used as decomposition zone can be found in U.S. Pat. No. 1,836,732 A (assignor: I. G. Farbenindustrie A. G.; filing date: Mar. 4, 1930).

U.S. Pat. No. 5,064,464 (inventor: Y. Sawada et al.; assignor: Mitsubishi Chemical Company Ltd.; filing date: Nov. 9, 1989) claims production of ultrafine metal particles in a reactor with a process where a high temperature diluent gas from a conduit is brought in contact with a mixed gas with the transition metal carbonyl compound from a nozzle outlet of a conduit. Heat of 300 to 800° C. for decomposition is instantaneously supplied from high temperature diluent gas. Clogging of this conduit and nozzle outlet is prevented with a low temperature diluents gas from another conduit around the nozzle in a concentric configuration. All gases are mixed at the position of the nozzle. The reaction time for gas phase pyrolysis in the reaction tube is less than 5 seconds. A magnetic field is applied to nozzle outlet and reaction system. The nano-particles are recovered from a collection chamber.

The process disclosed in RU 2161549 C1 (inventor: A. G. Rjabko et al.; assignor: OAO INST GIPRONIKEL, OAO KOL SKAJA GORNO-METALLURGICHESKAJA KOMPANIJA; filing date: Jul. 4, 2000) is preferably used for the production of Ni-nanoparticles with controlled size in the range 0.5 μm to 5 μm, where control is obtained mainly by means of temperature. This method uses thermal decomposition of Ni carbonyl diluted with the diluent gas carbon oxide from 10 up to 80 vol. % with addition of oxygen by 0.01 to 0.1 vol. %. Ni carbonyl and the diluent gas are fed with two separate feeders into the reactor. The flow rates of Ni carbonyl are larger than 83 l/min, while the flow rates of carbon oxide, pre-heated to temperatures between 20 and 220° C. is larger than 333 l/min. The internal temperature of the decomposer is between 240 and 280° C., by means of the decomposer inner walls heated to a temperature up to 470° C.

The apparatus used in U.S. Pat. No. 3,955,962 (inventor: W. Dawihl et al.; assignor: Klockner-Werke A G; filing date: Apr. 14, 1975) for the production of metal fibers by agglomeration of metal atoms under the influence of flux lines in a direction normal to a supporting surface and opposite to a flow direction of metal carbonyls shows a plurality of three or four conduits and vaporizing devices connected to a chamber of the apparatus, so that a mixture of different vapours can be decomposed together.

Another approach using a microwave plasma apparatus and chemical synthesis technique leading to ultrafine powders is described in U.S. Pat. No. 6,409,851 B1 (inventor: S. M. Krupashankara et al.; assignor: Materials Modification Inc.; filing date: Mar. 5, 1999). After chemical reactions are carried out in the plasma gas of different constituents within a plasmatron, the ultrafine powders are formed by rapid quenching of reaction products in a reactor column. The plasmatron can have radial or axial injector ports as well as a feed port for a raw material dosing device for chemical interaction in the plasmatron. The powders formed from starting powders or vapours are then instantaneously quenched in a reaction column, leading to the ultrafine powders. Reactants and products can melt evaporate and recondense in the reaction column in order to form special sizes. Also metal carbonyls can be fed into a reactor column by means of a vaporiser for liquids, which is heated with water pipes, in order to quench ultrafine powders.

Even continuous high power CO2 lasers can be employed for pyrolysis of nickel carbonyls for the production of an aerosol of particles, which is described in US 2006/225 534

A1 (inventor: M. T. Swihart et al.; assignor The Research Foundation of State University of New York; filing date: Oct. 12, 2005). Sulfur hexafluoride is added to the precursor stream of gas as a photosensitizer because of poor IR absorption of nickel carbonyl. A distance between the laser beam and an inlet nozzle for gas can be adjusted. A flow of helium is entered into the reactor through tubing as a sheath gas confining the reaction zone to a small region near the axis of the reactor.

WO 2007/136 389 A2 (applicant: Directa Plus Patent & Technology Limited; priority date: Aug. 10, 2005) proposes to employ a flow-reactor vessel which may be operated in a certain temperature range, pressure range and with controlled amount of added energy. Thus, the process of producing nano-scale metallic particles is basically controlled by the environmental conditions within the reactor. In a further embodiment, the reactants can be borne on a stream like a fluid stream, especially an inert gas stream which may pass through an injector into the reactor vessel. While WO 2007/136 389 A2 proposes to operate the reactor by feeding at least one metal carbonyl, a similar patent application by the publication number WO 2007/021 768 A2 (applicant: Directa Plus Patent & Technology Limited; priority date: Aug. 10, 2005) refers to continuously feeding at least one decomposable moiety selected from a group of complexes or compounds.

Additional further details how to produce nano-scale particles may be derived from WO 2007/021 769 A2 (applicant: Directa Plus Patent & Technology Limited; priority date: Aug. 10, 2005), WO 2007/021 770 A2 (applicant: Directa Plus Patent & Technology Limited; priority date: Aug. 10, 2005), WO 2007/142 662 A2 (applicant: Directa Plus Patent & Technology Limited; priority date: Aug. 10, 2005).

All cited prior art documents are incorporated by reference which means that the scope of the cited documents may be considered to be incorporated by their subject matter in place of citing their publication numbers. This is done with the objective to avoid redefining generally known terms of the present invention newly although known by person-skilled-in-the-art.

While first tests and developments have shown that reactor-vessels in accordance to the before cited five patent applications WO 2007/021 768 A2, WO 2007/021 769 A2, WO 2007/021 770 A2, WO 2007/142 662 A2, WO 2007/136 389 A2 may have advantages for fast results different reactor designs may be advantageous for producing nano-scale particles in laboratory environments, in small quantities, or in a range of equal grades.

BRIEF SUMMARY OF THE INVENTION

In general, different fields of application request for different reactors and different reactor designs to yield favoured nano-particles.

Consequently, it is one objective of the present invention to propose a reactor that may be employed instead of the known reactors.

Furthermore, it is one object of the present invention to propose facilities that may be operated to yield desired nano-particles.

One purpose of the reactor of this facility is the production of a wider range of nano-particle morphologies as compared to already published apparatuses. By one aspect, the reactor is meant to be operated for an industrially relevant scale of nano-particle products. In this context the implementation of the reactor within a production facility is most favourable. One other aspect of this invention is the possibility to implement the reactor preferably as a larger scale production facility for commercially useful devices like catalysts for purification of combustion fumes or photovoltaic converters. The facility thus may become a part of a production chain providing nano-particles as an essential component to any other technologically advanced nano-composite material for the improvement or development of desired material properties.

BRIEF DESCRIPTION OF THE DRAWINGS

Understanding of the present invention can be enhanced by referring to the following figures, which may show additional inventive aspects by themselves.

FIG. 3 is a schematic side view cross-section of a carbonyl flask injector for feeding the moiety mixed with a bearer gas into a reactor.

FIG. 4 is a schematic top view cross-section of a carbonyl flask injector in FIG. 3.

FIG. 5 is a schematic side view cross-section of a carbonyl flask seated in the flask injector of FIG. 4.

DETAILED DESCRIPTION OF THE INVENTION

Figure 1:
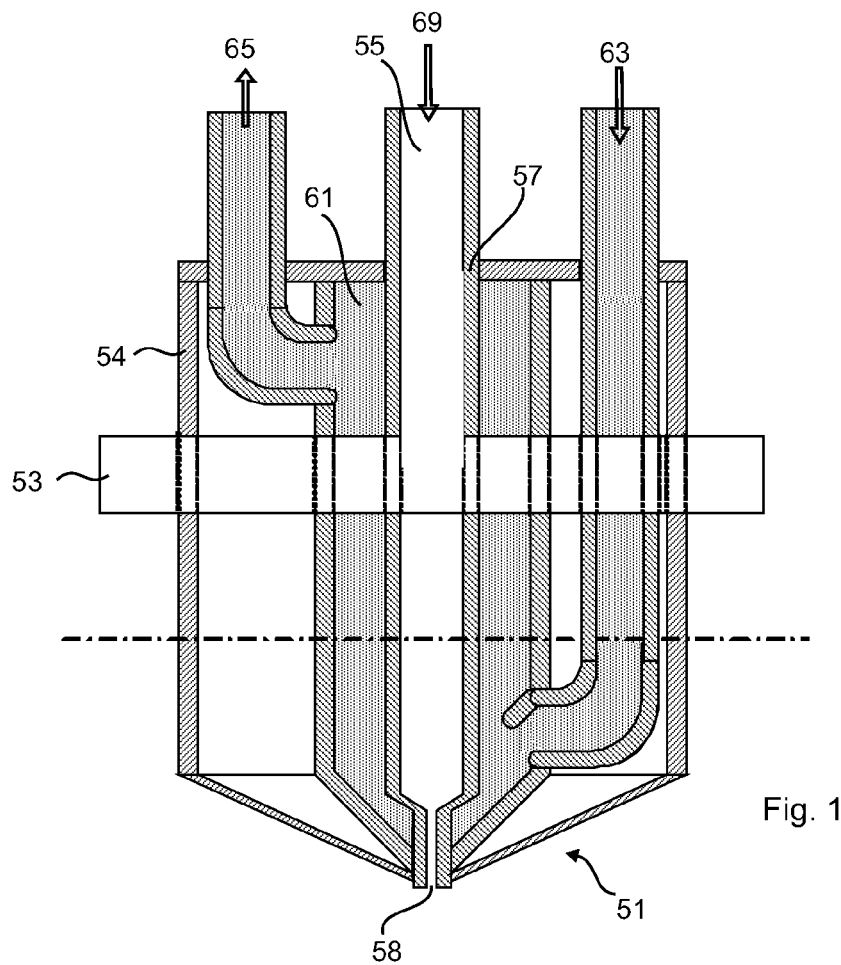
FIG. 1 is a schematic side view cross-section of a carbonyl injector for feeding the moiety mixed with a bearer gas into a reactor.

The reactor described in this invention comprises a reaction chamber and facilities functionally attached. The reactor encloses the reaction space by means of a vessel. This reaction vessel in one embodiment is a conduit preferably made of steel. In a different embodiment this reactor is a container preferably made of aluminium. For the requirement of transparency for optical monitoring of processes the preferred material the walls of the reactor are made of is glass. Other advantageously designed reactors form an enclosure of the reaction space with graphite or other synthetic materials, like PMMA, PCTFE, PTFE or PFA. Such materials are used in reactor segments, which remain at least 50° C. below characteristic material temperatures for structural stability. Further more such materials are chosen to meet process requirements e.g. in pressure, temperature and transparency for radiation. Synthetic materials, in particular PVDF or more preferably Polyimide as well as chemical derivatives of such are also applied for special chemically resistant inner coatings of the reactor. Inner coatings e.g. carried out as molecular coating of reactor walls improve the purity of residual gas within the reactor and in particular lower adhesive forces and thus lower e.g. the deposition rate of metals on surfaces.

In one application transparent surfaces are used when energy is transmitted from a radiating source of energy through reactor walls into the reactor in a process of nano-particle production. The preferable chemically inert construction material of the reactor and the form reminiscent of a cylinder are adapted to many reactions for nano-particle production carried out within. The reactor is preferably made of a single material like a glass composite. More preferably the reactor is composed of different materials, like glass where transparency for light is required or steel in segments which are exposed to overpressure. Such suitable materials are combined for specific requirements including stability under pressure, in particular as a supporting grid structure of steel for a reactor body, which, in one embodiment, is made of a synthetic material.

The reactions are decomposition of a starting material and agglomeration of activated building blocks for nano-particles. Also a combination of decomposition of reactants and synthesis of intermediate reaction products can be applied for the formation of specifically designed nano-particles. The fundamental requirement for the reactor specifications is the encapsulation of any possible reaction within the reactor, particularly the protection of the operating staff from any hazards caused by any uncontrolled release of energy or poisons.

In another basic function the reactor is providing a controllable environment for reactions carried out inside. By one aspect, the environment in the reactor can be characterized by energy in the form of temperature or kinetic energy of particles, which refers to pressure as well, or electromagnetic radiation including the whole spectrum and in particular ultraviolet, visible, infrared light and microwaves. This energy can be provided by different sources like a heated beam of particles, a surface heated with an electrical impedance heater or an intense microwave light source with 0.8 μm to 500 μm wavelength, a light emitting diode, an intense spectral lamp or a solid state laser or a gas laser. Also concentrated solar energy or solar light focused by sunlight collection mirrors can be used as a source of energy for the reactor.

In certain embodiments, several different sources of energy are applied to control the process of nano-scale particle production. This energy acts on substances within the reactor. Substances are preferably atomic like atoms of metal or noble gas or any other element of the periodic system of elements hereby explicitly enclosed in the description or cluster of atoms named nano-particle. Substances more preferably used in the reactor are molecular particles like metal bearing agents. Such starting materials are used for the composition of metal nano-particles mentioned throughout this description. By one aspect, the main source for heat transferred to the moieties constitutes a heating fluid. The heating fluid derives its thermal energy from a source of energy. In addition to the heating fluid, further sources of energy may be added to control the ambient temperature within the reactor. The thermal energy born by the heating fluid is employed in first place to provide sufficient energy to dissociate the metal moieties.

The term "ambient temperature" in conjunction with present invention is intended to describe the temperature within the reactor vessel. The term ambient temperature refers to the temperature of the environment in which the process takes place. In addition to the temperature in the reactor vessel further parameters contribute to the process management. The term ambient pressure defines in a similar way the pressure within the reactor vessel, which in some applications is a vacuum below the standard pressure of the outside air. In other applications the environmental pressure is preferably overpressure compared to the same standard.

Reaction conditions within the reactor can be controlled by means of parameters of the reaction environment, which are stabilized at a set value for constant process conditions. An increase of some parameters may be required in order to speed up processes. The lowering of a certain parameter maybe necessary when a limit due to material properties is approached. A parameter control system usually involves a measuring device, a regulating device and a controller device. Examples of parameters to be monitored in each production method for specific nano-particles are pressure in particular partial pressures, or density, temperature, flux or flow and/or concentrations. Preferably also the size and morphology of nano-particles produced is monitored. The operation of the reactor actually depends on a whole set of values for each environmental parameter. Such a set includes parameter distributions in particular over the walls and the volume of the reactor, the containment of the reactor and the functional attachments to the reaction chamber. In the operation of the reactor parameter variations in the course of time of the reactor operation are carried out. With such an operating system, production of metal nano-particles in the reactor is run automatic. In addition, the quality of yield may be kept to a very high standard.

For certain employments, one important environmental parameter is the temperature of the reactor. Reaction conditions within the reactor can also be controlled by providing thermal energy or electromagnetic energy using a respective source of energy. Reaction conditions within the reactor are controlled by means of pressure or density or concentration of substances preferably with a combination of several of the parameters. Reaction conditions are also controlled by the sequence, in which one or more substances are fed into the reactor. Any combination of variations of parameters and conditions of the reaction environment affects the reaction process and the balance of energy and substances produced or consumed by the reaction.

The reactor of this invention is preferably equipped with at least two feeders, a first and a second feeder. Both feeders are placed on the same one side of the reactor. In case the reactor looks like a tube, the two feeders are placed on one end of the tubular reactor. In case the reactor has the look of an elongated vessel, the two feeders are place next to each other on the very same side of the vessel, i.e. in the area of one extremity of the outstretched vessel. On one end of the reactor, at least one or two additional feeders like a third and a fourth feeder can be installed around the first and the second feeder. In a further embodiment, by the term feeder another configuration is considered as well. By the term feeder a feeder is addressed which is mounted on one end of the reactor with at least one other feeder attached to it. By other words, it means the feeder comprises two feeding parts in the form of a mixing feeder. The feeder can be made of the same material like the reactor vessel, especially due to manufacturing convenience.

In a different embodiment, the feeder can be made of a different material than the reactor vessel, for example, which can have a lower conductivity for heat, so that less cooling power is required. The process can be controlled more favourably, if the temperatures in each of the feeders, especially at one end of the feeders, are kept in a certain temperature range while the temperatures in the reactor vessel is kept in a second temperature range which is independent from the temperature range of one of the feeders. If the feeder for the transport of the moieties is kept below the dissociation temperature of the moieties the decomposition occurs in an initial part of the reactor exclusively. The feeder can be made of a transparent material in order to monitor deposits on the inner walls. A feeder can be a conduit, a tube or a pipe.

A particular advantage of a reactor with a number of feeders is the versatile operation in a through-flow mode. Such a flow-through mode of a reactor allows reactions to be carried out continuously by feeding one or a number of different moieties into the reactor on one end and obtaining one or a number of different products on the other end for extraction, storage, deposition or further use.

The special design of this reactor has been developed for producing nano-particles of metal from volatile moieties. The concept of this reactor can also be applied for the production of small particles preferably with nanometre-scale dimensions, which contain metal. Nano-particles are in general understood as particles with an average diameter on the scale of 1 nanometre (nm) to 1000 nm. Occasionally nano-particles are defined in the scientific community as particles with less than 100 nm diameter. In some applications the scale for nano-particles is set in the range from 0.6 nm to 600 nm. For reasons of stability under air, the size range of metal nano-particles is in some applications preferably limited to 350 to 1000 nm, preferably between 380 and 420 nm, more preferably between 440 and 490 nm. For reasons of catalytic activity nano-particle diameters can be required in the range of 5 nm to 400 nm, preferably in the range 55 to 95 nm, more preferably in the range 180 to 230 nm, most preferably in the range 310 to 360 nm. Such particles could be 5 nm particles of nickel. In optical applications including plasmonics, metal nano-particles with average diameters in the range of 2 to 200 nm, preferably in the range 4 to 45 nm are of particular interest. One advantage of this reactor is the capacity to produce narrow size distributions of nano-particles of metal like nano-particles of iron in the range between 13 and 17 nm. Combined materials can range between 18 nm and 25 nm. A narrow size distribution can be produced between 5 and 15 nm, for other applications between 530 and 580 nm or also between 850 and 950 nm. Large size distributions of more than ten nanometre or more than one hundred nanometre diameter nano-scale metal particles produced by the reactor are separated. Such distributions are separated into at least one narrow size distribution of less than one hundred nanometre width, more preferably less than thirty nanometre width, most preferably less than ten nanometre width for example by using separator means like a cyclonic separator or a filter connected to the reactor. Further aspects of nano-particle production for catalytic or optical applications are the crystallinity or the surface structure or surface roughness of particles with nanometre-scale dimensions.

In general, nano-particles can be particles which are spherical. In some optical applications particles, which are non-spherical are preferably used. In fact depending on crystalline properties, nano-particles can be cubic. Of course, by the set of parameters chosen the nano-particles may have other geometric shapes. The reactor allows the production of nano-particles, which are cigar shaped if the proper set of parameters are depict (like shown below). In this case the particles are named nano-particles due to the fact that their smallest diameter is of nanometre-scale dimensions, whereas their larger diameter or length can be more than 1 μm. As a matter of fact, the smallest diameter of such a nanometre-scale metallic wire can be no less than around 0.4 nm. Further types of products from this reactor under specific operational conditions are aggregates of metal nano-particles forming spherical or chain like structures. A special advantage of a versatile reactor like the reactor disclosed here for the production of such nano-particles is the production of nano-particles with controllable distributions of form parameters.

This through-flow reactor is preferably designed for metal nano-particles production from volatile moieties. In a flow through process, volatile molecules containing metal are fed into the reactor and nano-particles are produced. The volatile moieties are fed through at least one feeder into the reactor. The volatile moieties can be organometallic compounds, metal coordination compounds, metal complexes and atomic or ionic vapour of metal. Preferably metal carbonyls are used but other metal containing molecules and mixtures thereof can be supplied into the reactor through a feeder. In one application metal nano-particles of pure metal are produced in the reactor. In another preferable application metal nano-particles produced contain a mixture of at least two metals. In an alternative dedicated use, the nano-particles are an alloy of at least two metals depending on the moieties fed into the reactor. Nano-particles containing metal to more than 50% and less than 50% non-metallic admixtures are advantageously produced in this reactor, especially metals with non-metallic admixtures of around 50%, are preferable as admixtures for composite materials or resins.

The special design of a reactor with at least two feeders described in this invention is based on a moiety feeder as a first feeder and a radiator means for a heating fluid as a second feeder. Further feeders may be installed. However, a process in accordance with present invention may improve the quality of yield by separating the moiety feed stream and the heating fluid stream into at least two different feeders. The flow in each feeder can be controlled and managed independently. In another embodiment two heating fluid feeders are used together with one moiety feeder. The two are preferably operated at different temperatures more preferably also at different pressures, most preferably with different heating fluids and thus provide better control over some moiety decomposition reactions.

The moiety feeder delivers an educt fluid by which volatile moieties, especially volatile metal moieties, carried in a bearing gas enter the reactor. The bearing gas/fluid is used to transport the volatile moieties into the reactor chamber and regulate the concentration and flow of the metal moieties. Another function of the bearing gas is to equilibrate the moiety temperature with the environmental temperature of the feeder. In this way the moiety temperature, which depends on the evaporation process can be adjusted by heating or cooling the moiety before it enters the reaction chamber.

This can particularly be of advantage when different moieties of different vapour pressure are to be mixed and controlled partial pressures of the different moieties are to be achieved. In the embodiment of the reactor where different moieties are to be mixed, the moiety feeder comprises a mixing stage and at least two sources of moiety. Each moiety can be vaporized into its own stream of bearing gas. The flow of each moiety can be controlled separately before it enters the mixing stage, from where the mixture of moieties is fed into the reactor. Normally the relative concentrations of the mixed moieties correspond to the partial pressures. With independent flow control for each moiety stream, partial pressures of moieties in the mixture can be tuned. In this design the relative mass of at least two constituents within the nano-particles formed are adjustable.

By means of the radiator device the temperature of a heating fluid fed into the reactor is controlled. This heating fluid can be an inert gas or any other gas or a vapour like a spray of liquid that facilitates decomposition of the metal containing moiety within the reaction chamber. The heating fluid is selected so that it supports the formation of a particular morphology of nano-particles. It is advantageous indeed, if the heating fluid, especially the kind of conduit of the fluid also inhibits premature decomposition of a component of a mixed moiety. By means of the heating fluid the ambient temperature within the reactor can be tuned to a specific value required for the dissociation of the metal containing moieties and the formation of specific nano-particles. In a first embodiment, the radiator device transfers in particular heat from a solar energy collector to a heating fluid. In a second embodiment, the radiator device transfers also heat from a geological source to the heating fluid used for the reactor described here. Electrical heating of the conduit of the heating fluid leads to a very well adjusted temperature of the radiator means in the second feeder before entering the reactor. The radiator device can also transfer heat from a combustion process to the heating fluid. For a particularly energy efficient production facility the radiator device can be part of the cooling system for an exothermic reactor of a chemical processing facility, like a reactor for combustion of carbonoxide.

In one preferred method of production, nano-particles of metal are produced from metal carbonyls. Nano-particles produced in the reactor are selectively produced from metal carbonyls containing at least one of the following chemical elements:

niobium (Nb), tantalum (Ta), titanium (Ti), vanadium (V), chromium (Cr), molybdenum (Mo), tungsten (W), manganese (Mn), technetium (Tc), rhenium (Re), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au). This list is not meant to exclude other metals not mentioned explicitly by name for production of metal nano-particles in this reactor. Metal-organic compounds of at least one such metal atom with at least one $NH_3$ (ammine) or at least one $H_2O$ (aqua) or at least one CO (carbonyl) or at least one NO (nitrosyl) or at least one H2S (hydrogen sulfide) are used in different preferred production processes of metal containing nano-particles. At least one metal carbonyl is fed into a dissociation chamber. In one embodiment the dissociation chamber is a component of the reaction chamber of the reactor where dissociation of the metal carbonyl takes place. Other metal-organic compounds previously described are fed into the reaction chamber in preferred applications for the production of compound metal nano-particles. Such compound nano-particles contain a number of constituents bonded together in a matrix of metal. The metal is activated by stripping off other constituents of metal-organic compounds. The metal set free in particular by fragmentation of the metal carbonyl then aggregates in nano-particles in the course of collision processes.

The energy for the breaking of chemical bonds between the metal core atom and the shell or at least a part of the shell of carbonyl groups in this compound is provided as thermal energy. This thermal energy comes through a second feeder by means of a carrier fluid, typically an inert gas e.g. nitrogen.

In standard applications the carrier fluid resembles the bearer fluid as well. Certain advantageous production processes require the bearer fluid for the moiety to be a molecular species like hydrocarbons that can be thermally activated by the chemically inert carrier fluid that transports the heat into the reactor. Any gas like helium, argon, neon or nitrogen and the like, which can be heated up to temperatures of at least 245° C., more preferable up to 1050° C., most preferable up to 1650° C. and transfer this heat to metal containing moiety within the reactor for decomposition can be used as carrier fluid. Carrier gases with higher mass like argon or xenon or molecular gases are preferentially used when they facilitate the decomposition of the metal containing moiety, for example through more efficient energy transfer in collision processes. This effect is also satisfactorily achieved with a mixture of up to 20% higher mass particles in lower mass particles within the heating fluid. In other processes lower mass particles like He are preferred as a heating fluid because their particularly high velocity can be more efficient to excite vibrations within metal bearing molecules leading to fragmentation. In the case that nano-particle formation is carried out in a liquid environment, which sometimes is preferred when the final use of the product is within a colloid or paint, the production process requires a liquid heating fluid, which can be oil or an aqueous solution containing moiety. The carrier fluid thus provides the thermal energy, which activates the metal by decomposition of the metal carbonyl. Formation of nano-particles of metal is brought about through condensation of metal atoms. Nano-particles are formed as adducts from thermally activated moieties.

One advantage of the present invention is the mode of transporting the moieties like carbonyls in a bearing gas into the reactor. The heating is achieved by a carrier fluid like a carrier gas. The heat is transferred to the carbonyls embedded in a bearer fluid. The decomposition process of the carbonyls is very well controlled if the process is dominated by three different fluids: the moiety, the bearer fluid and the carrier fluid.

Nano-particles of metal are produced in particular from metal carbonyls using a method of feeding carbonyls to a dissociation chamber by a first feeder and a thermal energy for decomposition of the carbonyls by a second feeder. In one preferred aspect of this method, metal carbonyls are diluted in the first feeder using a bearer fluid like a bearer gas. This dilution preferably enhances decomposition of the moiety after mixture with the heating fluid, while it prevents any output channel of the feeder into the reactor from blockage by untimely decomposition of the moiety. Therefore mixture of heating fluid and moiety is carried out at a preferred distance of no less than 1 mm from the orifice of the moiety feeder in the reactor, more preferably at a distance of at least 5 mm, most preferably at an average distance of 18 mm. In such a configuration, the second feeder is positioned sideways from the first feeder positioned in the central axis of a reactor. The flow of heating fluid is directed to the flow of moiety at an angle so that both flows are mixing at before mentioned distance from the orifice of the moiety feeder, feeding moiety into the reactor.

In one embodiment, a central axis of the reactor is an axis which stretches across the reactor from one side to the other one. In particular when the reaction chamber resembles a cylindrical shape, the central axis follows the general symmetry axis of such cylinder. In a further embodiment, a central axis of the reactor coincides with the axis of gravity of the reactor. A different embodiment of the reactor establishes a central axis between the centre of a circular distribution funnel for moiety/heating fluid and the centre of an exit port for gravitational deposits from the reactor.

The special choice of a configuration with the second feeder providing thermal energy sideways from the moiety feeder and having an angle between the directions of flow from both feeders guarantees close interaction and efficient energy transfer to the moiety. Such a configuration is particularly useful in a continuous process having the stream of educts directed towards the exit of the reaction chamber. Prevalence of reaction products within the reactor is thus limited to the absolute necessity of time. Time is one of the essential parameters that defines the size and size distribution of the nano-particles of metal formed in the reactor. By means of directing flow from the side the formation of metal nano-particles is advantageously controlled.

On the other hand, time is an important parameter for cost efficiency. Such a reactor running a speedy process can be used to produce bulk material of more than 1 kg of nano-particles. This production method may be applied for production of nano-particles on a mass scale of up to 1 kg for a batch. This scale can already represent a supply for catalysts in industrial applications. With a production process for metal nano-particles as described in this invention based on the favourable design of a reactor disclosed here, batches with quantities of less than 10 kg of nano-particles can be produced. More than one batch of nano-particles can be produced per day. Batches of less than 10 g can be produced, when particularly rare starting materials are used. In one advantageous production routine, the batch of one preferable specific nano-particle morphology is less than 1 kg, while the same time a different batch of less than 500 g of nano-particles is collected as a by-product with more preferable nano-particle morphology. In one advantageous reactor design a third batch of less than 500 g of nano-particles is simultaneously collected as reaction by-product with most preferable nano-particle morphology. Batches of nano-particles of metal are indicating a production scale in terms of weight, which in continuous operation of this design of a reactor is easily exceeded. In continuous reactor operation, nano-particles are collected continuously e.g. by deposition on an endless tape, or extracted from the reactor in subsequent portions also named batches.

Further advantages and benefits of the invention can be derived from the following explanations which may bear additional inventive ideas by themselves.

This reactor has high moiety versatility. It is easily adjusted for the use of moieties in different states of aggregation by experts skilled in the art. The volatile moieties used can be solid vaporizable moieties. Examples for such solid vaporizable moieties are carbonyl compounds, especially metallic carbonyls, like carbonyl hydrides, carbonyl halides, hetero-nuclear metal carbonyls, acyl halides and multi-metallic carbonyls which are fed by the moiety feeder, especially by a carbonyl feeder, for decomposition of metal carbonyls. The moieties can be brought in a vapour state through exposure to a source of energy. Solid moieties are vaporized via melting from the liquid state. In the cases where the decomposition temperature is lower than the melting point, vapour phase moiety is obtained in a sublimation process. The vapour state of the moiety can also be produced without an external source of energy. In this case the ambient temperature of the reactor can be sufficient for vaporization. The heat for vaporization of the moiety can also be produced by exothermic reactions within the reactor. The process of vaporization of a moiety is typically based on the dependence of the vapour pressure of materials on heat. Nevertheless, also sputter processes can be applied for vaporization of solid moiety. The energy for vaporization of a moiety is then provided by energetic impact. The energy for this process is provided by light, electrons, atoms, ions, molecules or small particles, which the moiety is exposed to for vaporisation.

Such vaporized moieties are then fed by the moiety feeder, especially by a carbonyl feeder, for decomposition of metal carbonyls. Such vaporized moieties form the educt fluid, which can be mixed together with a bearing gas. The moieties in the gas phase can be flushed by a carrier gas through a moiety feeder into the reactor. In such a mixture of metal containing molecules with the bearing gas, the bearing gas can act like a buffer gas. The buffer gas shields interactions between molecular moieties. The buffer gas equilibrates the thermal energy and thus prevents unwanted condensation of the moiety that could disturb the feeding process. In this way, untimely decomposition and metallic deposits on the walls of the feeder causing blockage can be reduced. By using a bearing gas servicing periods of the reactor are prolonged. Metal deposits within flow control and measurement devices causing deteriorating functionality are negligible. Nevertheless, a stream of at least one pure moiety entering the reactor is preferred for some applications.

The energy for decomposition of the moiety can be provided by energetic impact of atoms, ions, molecules or small particles, which the moiety is exposed to. The energy for decomposition of the moiety can also be provided by energetic radiation using a source of photons. Such an additional source of energy in the form of light, laser light of microwaves can decompose metal compounds in a process called photo-fragmentation. The form of energy is chosen in a way that decomposition is affected in contrast to any transformation of the moiety into a less decomposable state.

It is indeed favourable for the performance of the reactor described here, when the second feeder carries a heated gas, especially an inert gas like a dinitrogen or a noble gas. Under certain conditions also dihydrogen, hydrocarbons, carbon monoxide or carbon dioxide can be considered inert gases and fed as a heater gas. Within the reactor, the heated gas transfers energy to the moiety such that the moiety decomposes.

Depending on the nano-particles to be produced, the heated gas can be fed to the reactor in multiple quantities of the flow of the educt fluid. The ratio between the volumes of educt fluid and heating gas is preferably such that there is more than one heating gas particle per moiety particle in the reactor. Since multiple collisions between heating gas particles and moiety particles may be required for heating the moiety up to decomposition temperature, it is important that a sufficient quantity of heat energy carrying particles is in the vicinity of a moiety particle. One way to achieve this is by feeding a multiple molar flow of heating gas compared to the molar flow or flux of vapour of moiety into the reactor.

For optimization of the reaction processes within the reactor, it is of advantage that the heated gas is conducted through means of temperature control before being forwarded to the feeder. A radiator device is regulated for energy transfer to the heating fluid. Within the radiator device energy from at least one source of energy is transferred to the heating fluid. A gas heater or heat exchanger may be sufficient to inject thermal energy into the carrier gas. The reactor is preferably equipped with means to measure and characterize the energetic state of the medium delivering the thermal reaction energy into the reaction zone. With precise control of the energy flow into the reactor, the production rate of certain species of nano-particles is optimized. A feedback control for the initial conditions of the reaction process allows stabilization of nano-particle production for many hours. With kilogram amounts reliably produced, this reactor can serve as a large scale production facility for nano-particles.

In one embodiment the radiator device is incorporated in the structure of the nozzle of the feeder for the heating fluid. The wall forming the nozzle channel is embedded in a lagged electrical impedance heater. With this heater temperatures up to 1200° C. are achievable in the walls of the nozzle and transferred to the heating fluid passing through the nozzle into the reactor. The heater is lagged for thermal isolation against the environment in the reactor. In a preferred design, the outer surface of this isolation is cooled by means of an attached cooling device. This cooling device is particularly efficient, when operated with a cooling liquid, which is passed through the gap in a double walled enclosure of the heated nozzle. In another embodiment instead of the electric impedance heater a pressurized heating gas is lead through a coiled tube attached around the nozzle channel. Thermal isolation and a cooling device are shielding the reactor from the heat introduced by this coiled tube heater. This compact nozzle design is energy efficient while decomposition of moiety on outer surfaces is inhibited by temperature control.

Following one perspective of the invention, a favourable design of the reactor is an elongated sprawled reactor. In particular, the elongated form may have the form of a pipe. With other words, in this case the form of the reactor is a cylindrical one. Although, the term cylindrical is used it does not mean the diameter of the reactor stays uniformly in all parts. In one embodiment, in the middle of the reactor the diameter is larger than the diameter on one end. In an alternative embodiment, the reactor has a conical shape, which is particularly favourable for a progressive expansion of a whirling flow. Another favourable design of a reactor is a coiled shape of an elongated cylinder or cone. With this coil shape particularly long elongated reactors can be built in small space. A torus shaped reactor for a circulating gas combines certain advantages of a cylindrical reactor and a coil shaped reactor. In such a configuration, the reactor itself is part of a heat exchange system when bathed in a heating fluid.

Particularly versatile is a reactor which has a mixing head. Here at least one metal bearing molecular moiety providing at least one species of metal is mixed together with the heating fluid. The core element of the reactor is the decomposition zone. A precipitation zone follows the decomposition zone downward the flow direction of the molecules. In the precipitation zone, it is possible to separate the wanted nano-particles from reaction by-products. An exit conduit is guiding the stream of reaction products from the precipitation zone towards at least one collecting tube. In a further embodiment, in the collecting tube the wanted species of nano-particles are to be deposited on the surface of a substrate. In a special design of the collecting tube, this tube is used in such a way that in the collecting tube nano-particles are accumulated and stored over several hours. In the preferred structure of a reactor, the educt fluid impinges on the heating fluid in the mixing head. After the mixing stage, both fluids, the heating fluid and the moiety, travel to the decomposition zone, where moiety conversion is accomplished.

Once nano-particles are formed, the reactor has at least one collecting wall for collecting nano-particles as a deposit to facilitate the collection of the nano-particles. The collecting wall is another expression for a collecting surface, where the surface is in particular the surface of a component or a substrate that forms an enclosure in the reactor, i.e. an obstacle against free flow of gas, which is therefore called a wall. On this collecting surface nano-particles of metal are accumulated. Another function of a collecting surface is to direct nano-particles towards further collection means like a particle trap. In basic operation at least one type of nano-particles is collected. Nano-particles of minimum dimensions are preferably collected from one area of the collection wall. As synthesized and purified in the precipitation zone, nano-particles of a minimum-dimension are collected by settling the nano-particles on the collecting wall. On the other hand, particles of a larger dimension are to be collected from a different area of the wall than nano-particles of minimum dimensions. Nano-particles of mixed materials with a minimum content of one constituent are to be collected from the wall. Nano-particles of mixed materials with a minimum content of one constituent are to be collected from a different area of the wall than nano-particles of a higher content. Nano-articles of elongated form are to be collected from the wall. In such an embodiment, nano-articles of minimum elongation can be collected from a different area of the wall than nano-particles of a higher elongation.

The preferred use of the precipitation zone is separation of particle sizes. An efficient configuration has the precipitation zone encircled at least partially by the collecting wall. This nano-particle collecting wall around the precipitation section preferably disembogues into the at least one collecting tubes. In other words, the nano-particle collecting surface around the zone, where separation for deposition takes place, discharges into at least one collecting tube. The at least one collecting tubes is situated flow-downward from the exit conduit. The at least one exit conduit is on a side of the reactor on the opposite end compared to the location of the first moiety feeder. The exit tube is located between the precipitation zone and the at least one nano-particle collector. At least a fraction of the flow of fluid with nano-particles is guided by an exit tube to a collector. The collecting tube collects the metal nano-particles of a minimum weight. The exit conduit discharges a product like carbon monoxide bearing metal nano-particles of smaller weight than the minimum weight. Such a configuration for mass separation of nano-particles narrows the width of the mass distribution of collected nano-particles. In this way, nano-particles of metal with a lower weight in some cases showing higher reactivity with oxygen can be separated from nano-particles with a higher weight and in some cases showing lower reactivity with oxygen. These are examples of different morphologies of nano-particles, which can be separated by the embodiments described before.

Nano-particle batches with specific size are produced with preferred embodiments of the reactor. Nano-particle batches are large quantities of nano-particles with a certain morphology produced in an operation cycle of the reactor. The operation cycle of the reactor is defined by the reaction parameters controlled over a period of time. Nano-particles of metal with specific optical properties depending on weight and size like optical absorption wavelength are produced in one type of this reactor. Also nano-particles having a particle weight corresponding to a particularly high catalytic activity are separated from nano-particles having a weight that corresponds to low catalytic activity, and collected in batches using another type of this reactor. In continuous operation of the reactor, a series of batches is collected e.g. from particle traps or collecting substrates, which are connected to the reactor or the cyclonic collector e. g. through rotary valves.

In the course of the production process, decomposed nano-particles are enveloped by the heating fluid. Especially the nano-particles will follow any cyclonic movement of the heating fluid. A cyclonic movement is a special case of rotating turbulent flow. Cyclones are known from special weather conditions in the atmosphere typically centred on an area of low pressure. Objects with a certain weight can be trapped and driven by a circulating stream of gas. In such a flow, where the nano-particles are transported following a Venturi effect, the flow velocity of the particles is related to the cross-section that is available for the flow. A higher flow velocity corresponds to a lower static pressure and leads to an uptake of surrounding material comparable with a water jet pump.

The nano-particles carried with the stream of fluid from the reaction zone can be collected based on their size in different stages. In one embodiment the reactor is concluded by at least three stages to separate different sizes of nano-particles. This three stage design consists especially of a first stage by which nano-particles of a dimension less than 100 nm are separated from the exit conduit. Especially in a second stage nano-particles of a dimension less than a limit in a range of 20 nm to 50 nm are separated from the exit conduit. Nano-particles of smaller dimensions than in the second stage are collected especially by a third stage.

The orientation of the first feeder and the second feeder is towards the same zone in the reactor. The first feeder is supplying the moiety and the second feeder the heating fluid to the reaction volume. The first and the second feeder are building a sharp angle. This sharp angle between a nozzle of the first feeder and an end of a conduit of the second feeder refers to the average direction of flow of matter from both feeders. In another embodiment the sharp angle is built between a nozzle channel of the first feeder and a nozzle channel of a second feeder. The angle between the two feeders is smaller than 90°. In order to obtain a good overlap between material flowing from feeder one and feeder two into the reactor, the angle can be smaller than 45°. Pointing with an angle of less than 10° between the flow directions towards the reaction area, the two feeders can even produce an extended overlap reaction zone within the reactor.

The flow direction from feeder one or feeder two or from both feeders can be adjustable for a range of angles in between the feeders. An adjustable angle between feeder one and feeder two can be realized by means of conduits of elastic material or at least one section of flexible conduit that interconnects the feeder and the reaction chamber. In this design the at least one flexible feeder is fixed by a least one stiff holder at a chosen angle between the two feeders. The stiff holder of the flexible feeder can be loosened, subsequently the flexible feeder can be moved to a different angle and the stiff mount can be tightened again. In this way the angle between the average direction of flow from feeder 1 and the average direction of flow from feeder 2 is adjustable between 90° and 10°.

For certain applications like the production of very small nano-particles of metal, reduced turbulences in the flow of moiety and heating fluid may be required. Reduced turbulences in the flow of the fluid can be achieved in an arrangement where the angle between feeder one and feeder two is approximately 0°. This can be achieved in a parallel design where feeder one is approximately collinear with feeder two. A very efficient configuration of this kind is a conduit of feeder one that is collinearly enclosed by the conduit of feeder two in the area where the fed fluids are entering the reaction chamber. This type of feeder configuration for feeder one and feeder two is called coaxial-feeder. Installed control valves will allow to adjust the relative flow velocities through feeder one and through feeder two. Controlling the geometry of the interaction region between the moiety and the heating fluid is one approach for control of the geometry of formed nano-particles.

The first feeder can be a seating flask. Especially a glass flask is occasionally used, with an outer diameter, which is seated in a reception hole of a smaller side of the reactor. The flask with an insertion depth in the reception hole will have an air tight connection, which eventually connects the volume of the flask with the volume of the reactor.

The insertion depth can be adjusted by an adjustable relative position between the seating flask, in particular the nozzle of the first feeder, especially by a flange of the seating flask, and the reception hole. The nozzle of the first feeder can be a capillary. In some special designs the insert depth can be adjusted by means of a thread around the outer diameter of the flask and a corresponding thread in a reception hole of a smaller side of the reactor. The insert depth is adjusted by turning the flask in one direction for smaller depth and in the other direction for a larger depth.

In one embodiment contact for flow of moiety between the capillary of the feeder nozzle and the flask containing the moiety is established by means of a needle with capillary channel linked to the moiety feeder that pinches a lid of the flask when the flask is inserted in the holder. Such configurations reduce impurities that might enter the feeder system and degrade the nano-particle products. Such arrangements allow fast replacement of empty flasks within large scale production like continuous or batch production of nano-particles.

Special pumping means can be connected to the volume of the feeder in order to remove residual air from the volume after connecting the flask. The purification of the feeder volume can be further improved by using attached purging means connected to the inert gas supply. The installed flask is flushed with inert gas like dinitrogen for removal of impurities. A particularly useful process of flask exchange is run with automatic purge by inert gas of all inner volumes of the moiety feeder that are exposed to air in the course of the exchange. Purging the moiety feeder is preferentially carried out before and after the actual flask exchange takes place. In addition a slight overpressure of inert gas can be applied to the moiety feeder during the time when no flask is connected.

Occasionally moiety is supplied to the reactor from a flask made of transparent polymeric material with high temperature resistance e.g. of more than 200° C., preferably more than 300° C., that is connected as a seating flask or as a first feeder. The exchangeability of flasks for different moiety adds to the versatile advantages of this reactor.

In a favourable design of the body of the reactor the heating fluid is directed in a whirling motion forming an eddy. This eddy is proceeding along the sprawled reactor body. The heating fluid evolves in a circular arc with a forward movement around a central axis of the reactor. The movement of the gas is especially in a flaring manner like a travelling cyclonic movement directed by a gas velocity. The particles are following a circular spiral path through the reactor with a radius that is widening towards the inner wall of the reactor. The widening process occurs along the travelling path, also called forward path which comprises a forward direction and a circular movement. At least two movements superimpose each other.

The formation of a whirling stream of the heating fluid is effected by the form or shape of the second feeder, which releases the heating fluid into the reactor. This can be achieved in particular when the second feeder ends in a distribution funnel. The whirling stream is supported through the distribution funnel throughout a production cycle of nano-particles.

Such a distribution funnel supports a circular movement of the heating fluid when fed into the reactor. The design of the heating fluid inlet may comprise at least one orifice. Orifices have typically a circular cross-section. The cross-section of the orifices can be non-circular if the specific geometric profile supports whirling flow in the reactor. In one embodiment an elliptical profile or a slit is used to provide flow in a range of angles that is wider in one dimension, which improves the whirling stream of heating fluid. The specific shape of the orifice can also improve the mixing of moiety and heating fluid for example by means of local turbulences.

The at least one orifice is preferably located in a circular arrangement. In the case of a distribution funnel with more than one orifice, at least one orifice can be used for feeding the heating fluid and at least one orifice of the distribution funnel can be connected to the moiety feeder. Each orifice directs a portion of the total flow. In one embodiment each portion of the total flow is directed tangentially from a circular configuration. In another embodiment the central axis of the orifices are pointing towards a direction, which is inside of the tangential direction thus creating a circular whirling stream, which starts out closer to the central axis of the reactor. In this way the retention time of moiety and nano-particles within the reactor can be reduced.

In still another embodiment the central axis of the orifices can also point towards a direction, which is outside of the tangential direction thus creating a circular whirling stream near the walls of the reactor. An angle outside the tangential direction means that the axis of the stream from the orifice is pointing towards the reactor wall with an angle smaller than 45° measured from the tangential direction of a circular distribution funnel. A direction inside the tangential direction means that the axis of the stream from the orifice is pointing towards the central axis of the reactor with an angle smaller than 45° measured from the tangential direction of a circular distribution funnel. In this way interaction between the moiety and the reactor walls can be controlled.

The average flow direction from the at least one orifice of the distribution funnel also represents an axis, which has an angle with the central axis of the reactor. In one embodiment for high throughput of fluid and minimum whirling of the stream, both axes are preferably parallel. In another embodiment the flow direction from the at least one orifice of the distribution funnel points in a direction, which has an angle of 90° with the central axis of the reactor. In this configuration slower throughput of fluid and strong whirling of the stream in a plane oriented parallel to a direction given by a smaller diameter the elongated reactor is realized. This is also used as a mode for storage of nano-particles within the reactor. Under whirling conditions residence time of nano-particles within the reactor of more than 0.5 minutes, preferably more than 1.5 minutes is achieved.

The distribution funnel therefore is directing heating fluid including the moiety within the reactor. The flow of heating fluid is absorbing the moiety while entertaining a circular movement of fluid in a plane rectangular to a central axis of the reactor. The central axis of the reactor stretches from the side of the reactor containing the distribution funnel to the side of the reactor forming reactor bottom. This direction is in particular rectangular to a direction of the reactor describing a smaller diameter of the reactor. This circular movement is formed by the distribution funnel in a first orientation. In a second orientation of the distribution funnel, heating fluid and moiety are directed in a circular flow along a plane parallel to a central axis of the reactor. In this mode of operation, a flow of gas is leaving the distribution funnel in direction towards reactor bottom. Propagation in a circular way with a change in direction is due to deflection of gas flow near reactor bottom. The fluid is returning from reactor bottom and thus approaching the distribution funnel, where it is further enriched with heating fluid and moiety. Turning the flow of fluids near reactor bottom in a reverse direction is in one example of a reactor advantageously supported by a feed of inert gas through a feeder near reactor bottom. This additional feed, preferably of a similar fluid that is prepared like the heating fluid from the second feeder, forms a deflecting layer at reactor bottom and in particular prevents nano-particles of metal and moiety from touching the walls of reactor bottom. The two orientations for directing the heating fluid in this type of a reactor are achieved by having two different distribution funnels on one side of the reactor. One distribution funnel directs circular flow of fluid in a plane perpendicular to the central axis of the reactor and a second distribution funnel directs the flow along a plane parallel to the central axis of the reactor. In another embodiment the two directions are established by changing a position of a deflecting plate within the distribution funnel. Another advantageous reactor provides the two modes of circular gas flow alternatively through the orientation of first and second feeder orifices within one distribution funnel, which are adjustable from outside the distribution funnel e. g. with a mechanical feed-through. Using such a second type of circular flow in the reactor, residence time of nano-particles within the reactor of more than 2 minutes, preferably more than 5 minutes is achieved.

In such an advantageous versatile configuration intermediate angles between 0° and 90°, meaning between the initial flow of heating fluid parallel or perpendicular to the central symmetry axes of the reactor respectively, are selected for at least one orifice of the funnel. In one version of the reactor, the direction of the flow of heating fluid from the distribution funnel is adjustable by external action in order to optimize the output distribution of nano-particle morphologies. Such intermediate angels are particularly useful to optimize nano-particle production efficiency e.g. for batches or for continuous deposition on substrate surfaces. Adjustments of the distribution funnel are also applied to improve the production of a specific morphology of nano-particles. Production efficiency of nano-particles means requirements of energy and moiety for the production of a batch of a specific type of nano-particles in a given time. However, variation of angles for gas flow from the distribution funnel is also applied in the pre-operational state of the reactor using inert gas in order to speed up cleaning the walls of the reactor.

Operation of the reactor in a pulsed mode by changing the direction of flow of the heating unit by means of the distribution funnel is another feature of this versatile design. Feeding as well the decomposable moiety in pulses into the reactor is certainly of advantage in such a mode of operation. First a predominantly circular flow driven by the flow from the distribution funnel can provide nano-particle storage for growth. Also processing of stored nano-particles is carried out for the production of certain types of nano-particles in the reactor. Processing involves chemical processing by means of reagents fed into the reactor through a third feeder. For some reactions on nano-particles reagents are admixed to the heating fluid. Processing also involves physical processing by means of exposing the nano-particles stored to energy provided from an external source of energy. Then the mode of operation of the distribution funnel is turned to a flow that pushes the stored nano-particles out of the reactor.

In some cases when the moiety is already decomposable at low temperature, stabilization of the feeder temperature at a temperature below ambient temperature may be required. During some reactions within the reactor, heat is conducted from the reaction chamber at elevated temperature towards the first feeder, which may cause unwanted decomposition of moiety within the feeder. In such cases the first feeder is a permanently cooled feeder. Especially a feeder cooled by a cooling liquid like cooling oil, which preferably bathes the surface of the nozzle, provides a stabilized input of moiety. Liquid air or liquid nitrogen are fluids suitable for cooling the nozzle to low temperatures. The cooling oil is preferably low viscosity oil with good flow characteristics. For some processes the cooling liquid is preferably water, in particular when the installation of the reactor requires an easily available source of cooling liquid. Efficient heat exchange is achieved when the cooling liquid circulates the feeder in an attached coiled tube. One efficient design has a meandering channel for cooling liquid within the structure of the feeder.

Temperature stabilization of a feeder is achieved by active control of the flux of a cooling liquid of a defined initial temperature. Temperature control of the first feeder is preferably carried out fast and accurate in order to achieve high vapour pressures near the decomposition temperature of moieties. For this purpose the flow of cooling liquid is directed to the orifice of the first feeder where the moiety enters the reactor. One embodiment has this orifice of the feeder designed with a double wall structure with the volume between the double walls flown through by the cooling liquid. Efficient cooling of the first feeder nozzle through a double walled structure helps to prevent the nozzle from being blocked by metal deposits from decomposing moiety. A cooling gas e. g. cooling air from a ventilation system replaces the cooling liquid for cooling the nozzle when cooling liquid is not available. In another embodiment temperature control of a feeder is achieved by attaching the feeder to a cryostat so that there is direct flow of heat between the cryostat and the feeder, preferably the nozzle of the feeder. In yet another embodiment the temperature of the feeder nozzle is controlled by attaching a Peletier element to the nozzle, which is connected to a heat exchanger in air in the case that facilities for handling cooling liquids cannot be provided at the site where the reactor is operated.

The first feeder of the carbonyls in the reactor is supplied by a pre-mixed stream with moieties. In a number of applications, the moieties in the stream are admixed carbonyls. Especially one or more different metal carbonyls can be added in the stream of moieties. Other metal bearing molecular species like metal complexes, organometallic compounds or metal coordination compounds can also be admixed in the moiety stream for certain production recipes. Reductive agents set free by decomposition of a first moiety are in some special applications of the reactor used to support decomposition of a second different admixed moiety. The mixture of metal carbonyls with other metal complexes preferably results in an increase of the decomposition rate of at least one moiety in the reactor. Nano-particles with defined internal structure and composition are produced by using a pre-mixed stream of moieties.

Mixtures of organometallic compounds with metal coordination compounds of different metals provide new pathways for the production of nano-particles of mixed metal. Such particles, which are produced with one embodiment of this reactor, have a concentration profile of one metal against another metal as a function of the particle radius. Production of nano-particles with internal structure is carried out in process comprising at least two steps. First a core predominantly from decomposition of a first moiety is formed, which then is enclosed by a shell predominantly from decomposition of a second moiety. The decomposition temperature of the first moiety is preferably higher than the decomposition temperature of the second moiety. The concentration of one metal in the core of the nano-particle can be higher than 90%. The concentration of one metal in the shell can be higher than 90%. One type of nano-particle has a layer thickness of 10% of the particle diameter. The shell of the nano-particle can also be adjusted to a layer thickness of preferably 40 to 50 nm, more preferably 5 to 10 nm most preferably 1 to 2 nm or any size in between in order to provide a protective layer for a more reactive core metal. A thin layer can be particularly requested, when optical or magnetic properties of the nano-particles should be similar to the core metal. One preferred way to produce such composite nano-particle structures is by feeding two different moieties and two different heating fluids, each one through a dedicated feeder.

Mixtures of organometallic compounds and metal coordination compounds of the same metal are used for the production of nano-particles with a gradient of density from the centre to the surface. Such a gradient is due to different decomposition rates of the moieties of the same metal and thereby different growth rates and different environmental temperature for the growth. Such a process starts first with the formation of a high density core predominantly from decomposition of a first moiety, which is enclosed by a low density shell. The density in the nano-particles produced may be related to crystallinity. Such a structure shows improved reactivity for chemical functionalization in post production modification of the nano-particles. In some cases of metal also the chemical stability in an oxidizing environment is improved by creating a nano-particle with a shell structure. By means of an optimized surface roughness of the nano-particles of metal produced with mixed moieties a particularly high density of catalytically active surface sites is provided.

Two different moieties with different decomposition temperatures are used for the production of special types of nano-particles. Moieties are mixed with a bearing gas in the moiety feeder. In another embodiment this moiety feeder is a compound moiety feeder consisting of at least two moiety feeders. Each moiety feeder is delivering one moiety mixed in a bearer gas into the reactor. In yet another embodiment a secondary heating stage is provided in the reactor. Such a two stage growth process is implemented with an additional third feeder used for feeding a heating fluid with a temperature higher than the temperature of the heating fluid that is fed through the second feeder into the reactor. This third feeder for a heating fluid preferably ends in a distribution funnel. In one embodiment this second feeder with distribution funnel is connected sideways to the body of the reaction chamber. Through this second feeder heating fluid is fed into the whirling stream within the reactor. This distribution funnel has preferentially at least one orifice, which is directing the fluid in the flow direction of the whirling stream. More preferably the flow direction from this distribution funnel is adjustable by external action. This second feed of temperature controlled fluid preferably supports the whirling stream. One application of this second feed for temperature controlled fluid is heating up pre-formed nano-particles after a growth phase. This additional heat provides the energy for an annealing process of the nano-particles.

This second feed of fluid in particular like carbon dioxide or dinitrogen can be a different type of fluid compared to the first fluid in particular like dinitrogen, or noble gas, respectively. Admixtures of process gases like $H_2O$, $H_2S$, $NH_3$, CO or $O_2$, either pure or in combination of at least two gases with preferably 90%, more preferably 5% inert gas dramatically change the morphology of nano-particles of metal produced, when otherwise operational parameters of the reactor are kept constant. Such a selected different second feed of fluid provides better growth conditions around a pre-formed nucleus produced with the first feed of heating fluid. In this way unique morphologies of metal nano-particles can be produced. The fluid from this additional feeder can thus be used to provide a temperature required for decomposition of a second admixed moiety from the moiety feeder. By means of a second admixed moiety fed through the first moiety feeder, the second feeder used for the heating fluid and the additional third feeder used for a heating fluid at higher temperature a special reactor comprising two reaction areas for nano-particle production can be realized. In one embodiment, this second feeder for a heating fluid is equipped with a second feeder for a decomposable moiety. This is particularly useful for the production of structured composite nano-particles by means of a second moiety that decomposes at a lower temperature than the first moiety.

The temperature provided by this third feeder, which is the second feeder for the heating fluid, is used in a different embodiment to melt pre-formed nano-particles. In this way spherical nano-particles of homogeneous structure and material properties are formed. Such nano-particles are alloys of at least two metals. Other preferred nano-particles are formed of a metal to more than 50% and of an admixed non-metal element like carbon (C), oxygen (O), nitrogen (N), or sulphur (S) to less than 50% of the atomic constituent numbers of particles. For some specific applications using additional heating with a heating fluid fed through the third feeder into the reactor, larger spherical nano-particles in the range of 300 to 1000 nm diameter are formed from aggregates of smaller nano-particles of metal in the range of 1 to 100 nm. Such aggregates can be formed from nano-particles of different materials, e.g. nano-particles of metal and nano-particles of semiconductor type.

In certain applications this fluid fed through the third feeder into the reactor is used with a lower temperature than the heating fluid fed through the second feeder on one end of the reactor. When a cooling gas like dinitrogen that is cooled close to condensation temperature is mixed with whirling flow bearing the nano-particles within the reactor, nano-particles can loose internal energy in a collision process. The cooling gas is preferably a gas with low mass like Helium. With the design of a reactor described before, the low temperature of the fluid from the third feeder provides rapid cooling of the temperature of sensitive nano-particles. In one advanced embodiment, the reactor is equipped with a fourth feeder of similar design as the third feeder described above. In this case the third feeder is used for the second heating fluid whereas the fourth feeder is used for the cooling fluid. The process sequence of this reactor consists in particular of nano-particle formation, aggregation, melting, restructuring during cooling and collection or deposition.

The different embodiments of a reactor described here constitute a reactor design with a number of adjustable features, which makes it a highly versatile reactor. Every specific embodiment of this reactor for nano-particle production can be used for multiple production methods through variable sets of production parameters, with each set particularly optimized for the rate of yield of one specific nano-particle morphology.

A number of parameters of the reactor according to this invention can be tuned for the optimization of desired nano-particle properties like size, outer shape, composition internal structure or functional properties like optical spectroscopic properties, magnetic properties, chemical catalytic properties or photovoltaic properties. In particular the morphology of the nano-particles is controlled by at least one of the following:
a. temperature of the heating fluid,
b. quantity of the heating fluid,
c. gas velocity, in particular of the feed
d. the feed of the first feeder,
e. proportion of heating fluid to educt fluid,
f. distance of first feeder from second feeder,
g. length of decomposition zone and/or
h. strength and direction of an imposed magnetic field
i. other adjustable parameters, components or configurations introduced in the previous description of the invention.

The previously described reactor is typically used as the central part of a production facility for nano-particles. A cluster of at least three functional sub-units constitute this production facility. When used for the production of nano-particles of metal, this nano-particle metal production complex produces metal nano-particles preferably from carbonyls. In this production complex organometallic compounds like metal carbonyls are processed by a flow-through reactor. The production complex comprises the reactor as the core unit, which transforms feedable moieties into extractable metal nano-particles. The production complex also comprises auxiliary units to supply decomposable moiety. Such auxiliary units can be used for the measurement and control of concentration, of flow or flux in a similar sense, or of density of moiety supplied into the reactor. Auxiliary units are used in order to measure and control gas pressure and temperature within the feeders or within the reactor vessel. In one embodiment the flow of magnetic nano-particles within a reactor vessel is monitored by means of a magnetic field detection unit. In another embodiment the flow of heating fluid within a reactor vessel is monitored by means of a detection unit for infrared radiation. In yet another embodiment the flow of nano-particles within an optically transparent reactor vessel is monitored by means of a detection unit for resonantly scattered light. The core unit of the production complex, the reactor decomposes carbonyls by controlled ambient temperature inside the reactor.

In one advantageous configuration, aggregates of nano-particles with special morphology are produced, like nano-particles consisting of different metals or semiconductor-metal aggregates with a Schottky barrier. Semiconductor materials can be silicon, germanium, cadmium sulphide, copper oxide, titanium oxide or gallium arsenide, molecular configurations of carbon and derivatives thereof. In this configuration of a production complex two reactors with separate feeding units for different moieties, one for metal carbonyls and one for organometallic compounds are combined. In this way each moiety is decomposed in a separate reactor, and corresponding nano-particles are formed. Once the flows of nano-particle products are combined, e.g. in a common storage unit like a cyclonic storage device such aggregates of different nano-particles are formed. Such nano-particles can be applied as opto-electronically active elements in photovoltaic devices.

Another advantageous sub-unit of the production complex is a heating feed line that is connected to the reactor. In an operational state the heating feed line delivers a heatable inert gas like nitrogen. In a pre-operational state, the inert gas is usable for cleaning a carbonyl feed line to the reactor. Cleaning the feed line and the reactor with a heatable inert gas reduces the level of impurities in the nano-particles produced. This is particularly useful before the start of production of a new batch, in particular of a new morphology of metal nano-particles. Purging the inner volumes of the production complex, which are exposed to moiety and heating fluid is usually required before a new type of moiety is fed into the reactor. Changing the bearing gas of the moiety also requires cleaning of the internal surfaces and the internal volume of the feed line with a cleaning gas in some processes. This guarantees high purity of the produced nano-particles better than 99.9% depending on the purity of educts. Typical purity levels for this production complex are better than 98%.

Depending on the production process, flushing the moiety feeder through the reactor is required for the removal of hazardous or poisonous vapours or gases before any servicing routines are carried out. Any reaction by-products dissolvable in a stream of purging fluid will be removed from the reactor. Residual metal deposits on the reactor walls are etched away in an oxidizing stream of gas in a pre-process flushing procedure. After a possible exposure to air during maintenance or exchange of moiety flasks, oxide layers on the inner walls of the reactor are reduced in a pre-process stream of 5% hydrogen gas mixed with inert gas. This procedure reduces diffusion of oxygen from the inner walls of the reactor into the volume. Residual water molecules formed at the inner walls of the reactor during such a procedure are removed with standard pumping equipment providing pressures below the vapour pressure of water. In the case of persistent impurities the reactor is baked with a source of energy up to at least 110° C. while purging gases are flushing the internal volumes. In addition pumping means can be applied.

Installments of the production complex for metal nano-particles described in previous paragraphs are used with advantage for many production methods. One preferred method involves keeping nano-particles in a reduced oxygen flow. In one installment the oxygen is mixed with the inert gas provided by the heating feed line. In another advantageous installment the oxygen is provided through a separate feed line into the reactor, which is operated at a temperature lower than the heating feed line, e.g. at standard room temperature or more preferably below 0° C. The flow from this additional feeder is adjustable by an expert to minimum disturbance of the whirling gas stream of the flow-through reactor. The nano-particles are especially kept in a flow of less than 10%, preferably less than 5%, more preferably between 2% and 0.1% most preferably less than 30% of oxygen in nitrogen. This dinitrogen flow bearing oxygen exposes the nano-particles to oxygen for at least one minute, preferably more than 20 seconds more preferably less than 10 minutes. After this period of exposure to oxygen, the nano-particles are extracted from a flow-through reactor. Such particles have a well prepared pure metal oxide surface, which in some cases improves catalytic activity, in other cases it improves resilience of catalysts against catalyst poisoning by impurities during operation. Such a method immunizes some metal nano-particles against adsorption of impurities when exposed to air. In addition any reaction with air like reactions under exposure to light is suppressed and in particular the phases of the nano-particles are stabilized. Further more such catalyst particles are advantageously processed chemically for improved material properties.

The complex for the production of metal nano-particles comprises at least one valve. This valve connects a source of the inert gas to the carbonyl feed line and allows to regulate the flow or to shut off the inert gas from the carbonyl feeder. In this way the valve separates the heating feed line and the carbonyl feed line in a first position. The valve can be a proportional valve equipped with a solenoid and capable of remote controlled operation by an electronic process control device. In applications where a fine control of the flow is required, a needle valve driven by a stepper motor is installed.

Another sub-unit of this feeder particularly implemented for pre-operational operational processes is the heating feed line. The heating feed line comprises a heater, which is started in the pre-operational state especially before the carbonyl feed line is cleaned. By means of this heater, preferably an inert gas like Argon, Helium or Nitrogen is heated up to 200° C., more preferably up to 500° C., most preferably up to 1500° C. Pre-operational heating of feed lines speeds up the process of thermal equilibration which is of great advantage for providing stabilized environmental reaction conditions. Such pre-operational processes are also referred to as pre-process routines. In some procedures pre-operational processes precede pre-process routines.

Another subunit of the feeder is an evacuation system. For evacuation the carbonyl feed line comprises a valve, which is connected by a conduit to a vacuum pump. This exciting feature allows the user of the production complex not only to pump the volume of the feed line but actually to evacuate it to pressures lower than the standard atmospheric pressure. Any expert in this technology will know that any valve, which connects the feed line to any gas supply like the source of the inert gas to the carbonyl feed line, is preferably closed during evacuation. With pumping means like a rotary pump volatile impurities are removed from the feeder system. In addition the pumping means are used to regulate the pressure in applications when production is carried out using a moiety feeder pressure in the sub-atmospheric pressure range.

Such operations are preferentially carried out with automatized routines by a controller program that is handling sensor input like pressure, temperature, flow, or impurity levels while controlling the operation of radiators, heaters, valves and other process regulation units in the pre-operational phase. In the operational phase the controller program monitors in addition the nano-particle output with spectroscopic means, regulates production process parameters and drives the collector units.

The carbonyl feed line is a pressure conduit. The operational state of this feed line at pressures below the atmospheric is particularly useful when a low flow of moiety is required for slow growth of nano-particles. The pressure applied for this purpose is typically in the range from 0.5 to 1000 hPa. Under slow growth conditions, metal nano-particles are preferably grown crystalline. Pressure above atmospheric pressure is used in some selected applications of the reactor. The scale of such pressures ranges from 1001 to 25000 hPa. This pressure range is typically used for the production of larger quantities of nano-particles. Additional use of this pressure range is for the production of larger nano-particles in the range 500 to 1000 nm. Even metal particles on a size scale up to 10000 nm are produced on demand. Nano-particles produced within the high range of feeding pressures are often amorphous. The high pressure range is preferentially used in the pre-operational treatment of the carbonyl feed line. Eventually it is the pressure that carries the pressurized carbonyls into the reactor during the operational state.

Another useful sub-unit of the production complex is a scrubber. A by-pass-line is connected to the carbonyl feed line of the complex by a valve in order to complement the pre-process arrangement. In pre-process mode residual gas with carbonyls is directed outside of the reactor to a scrubber. In this special mode, purging of the carbonyl feed line is carried out, but the purging fluid is not passing through the reactor. This process for cleaning before changing the moiety or after replacing the flask with moiety is much quicker than with a flow path through the reactor. The bypass is used to vent impurities or mistaken moiety from the feeder and keep the reactor volume clean. In a preferred installment, the concentration of carbon-monoxide in the by-pass line is monitored with a sensor for carbon-monoxide. This sensor is a unit, that when exposed to carbon oxide, forms an electrical signal. The signal is read with a monitoring device which is typically a control unit for valves and pumps. This signal is preferably proportional to the concentration of carbon oxide. More preferably the sensor is a mass-spectrometric unit, which can detect the full mass-range of possible impurities purged from the moiety feeder in relative quantities.

The carbonyls transported through a conduit to the scrubber are removed from the carrier gas in the scrubber. A scrubber cooled by cooling water is particularly efficient for this purpose. The scrubber can also be cooled with cooling oil. Cooling oil can be the preferred cooling liquid in the case that cooling oil is the standard cooling medium of the production complex. Cooling oil is also the preferred cooling medium when metal carbonyls and metals highly reactive with water are processed in the reaction complex. The carbonyls recovered with the scrubber are recycled for later production runs. Carbonyls from the scrubber with high impurity levels are safely disposed.

Particularly advantageous sub-units of the production complex are means for extraction of the product of the reactor, namely metal nano-particles from the reaction centre. Extraction from the continuously operating reactor is preferably carried out in a continuous mode in order to provide for batch production on a scale of more than 50 g per day, preferentially more than 200 g per day, more preferably 1 kg in 8 hours, most preferably 10 kg in 5 hours. Such an extractor sub-unit can direct metal nano-particles towards any further use, for example as an admixture in a composite material for better opto-electronic properties. In some applications such a composite material is a polymer, which is casted into various forms. In other applications the nano-particles are embedded in an optically transparent matrix like a glass. Another application of metal nano-particles from the extractor of this continuous flow through reactor comes from deposits on substrates, which are continuously passed under the output side of the extractor on a conveyor system like a conveyor belt or a carrier band for photovoltaic structures.

This complex comprises at least two particle-traps, by which particles of different dimensions are withdrawn from the production complex. The nano-particles are extracted from the stream of reaction products. Usually the stream of produced metal nano-particles is fractioned into at least two components. The at least two components are extracted at different locations from one end of the reactor. Smaller nano-particles with typical diameters of less than 100 nm are carried by the bearer stream while larger nano-particles are separated by force of gravity. Components used in this extraction are for example end use substrate surfaces. Traps, in particular traps attached to cyclonic separators or filter units are made of metal like steel or aluminium, preferably of glass, more preferably of ceramic most preferably of low cost fibre glass resin composites or any suitable plastic. Also combinations of such materials are used. Materials with chemically or biologically functionalized surfaces, in particular surfaces covered with molecular films like alkane thiols, on which nano-scale particles are collected, are used in special applications. The filters themselves are replaceable elements, which in one embodiment have pore sizes in order to collect particles that are larger than a minimum size. In a different embodiment collection is achieved by adhesive forces between metal nano-scale particles and filter surface.

In one installment momentum transfer from a collision gas fed through a fifth feeder in a perpendicular collision configuration can be used to separate nano-particles with diameters of less than 10 nm. In this configuration nano-particles are deflected from a propagation direction by momentum transfer in collisions. Low mass particles suffer stronger deflection than high mass particles. In some applications this method is used to separate different morphologies. In other instalments chromatographic techniques are applied for separation of different morphologies, because propagation of nano-particles in a fluid medium depends on the strength and physical nature of the interaction with this medium. Again in another installment mass separation of magnetic particles is carried out by deflection from the flow of reaction products at one end of the reactor by applying a magnetic field. In one further installment, mass-spectroscopic means are applied for mass separation of small size nano-particles. In this case nano-particles are decorated with an electric charge and guided through a standard combination of electric and magnetic sector fields. In a certain variation of this design the ionized nano-particles are deflected and guided on a circular path by means of electric or magnetic fields and ion optics for storage and accumulation. The ionized nano-particles can be neutralized again using standard electron detachment or soft landing techniques for ionic nano-particles on electrically conductive substrates. In yet one other installment, each fraction of nano-particles is stored and accumulated in a separate whirlpool device, in which an inert gas is carrying the nano-particles in a whirling stream.

In the start-up phase of a production cycle for nano-particles, the production complex is preferably thermally stabilized in order to reduce parameter drift during production.

In this pre-operational state, a flow-through reactor and conduits towards the flow-through reactor are heated by an inert heating gas. Especially nitrogen is used as an inert gas for pre-heating the conduits and the reactor. A sequence using first a reactive gas for cleaning or passivation of internal surfaces of the gas feeding conduits with flow through the reactor followed by the flow through of the heated inert heating gas is of advantage. In some cleaning procedures reactive gas like a mixture of less than 10% hydrogen with an inert gas is used. Other applications require a mixture of less then 10% oxygen diluted with an inert gas. Persistent impurities are removed by increased reactivity by applying pre-process flow of heated reactive gases, followed by purging with inert gas.

In some cases of operation the temperature of an injector has to be maintained at a lower level of temperature than the reactor. This injector is in some instalments a conduit or a nozzle. In other instalments the injector is a distribution funnel. The injector of the reactor is cooled, especially by a surface bath of the injector. Cooling the injector is preferably done after heating the injector together with the functionally attached feeding conduits, valves and the whole reactor volume by a stream of heated inert gas for about 1 hour. Then the injector can be cooled to the stable operation temperature in the pre-operational state. A stabilized operational state at the beginning of production of nano-particles reduces the width of the distribution of morphologic parameters. With such a pre-operation procedure already the first batch of nano-particles is produced in standard quality. This results in a significant gain in efficiency of nano-particle production, saving production time, moiety and energy.

Once the pre-operational routines are completed, production of metal nano-particles is initialized by feeding the carbonyl moiety. This is typically done by feeding carbonyls to a bearer stream. In typical applications this bearer stream is an inert carrier gas. In special applications, the bearer stream is enriched by up to 50% carbon-monoxide (CO). The admixture of CO impedes premature decomposition of the carbonyl species. The carbonyls are injected into the bearer stream by evaporation out of a pressurized carbonyl source. One way of pressurizing the carbonyl source is by applying heat below the decomposition temperature to the flask containing the carbonyls.

This bearer stream can also be liquid. A successful method for introducing the carbonyl into the bearer stream is especially by mixing of the bearer stream and a carbonyl stream before passing an evaporator. In such a mixture constituents of the bearer stream increase the vapour pressure of the mixture and support joined vaporization of the carbonyl moiety with the bearer diluent. With another method evaporation of carbonyls is improved by pumping the liquid through an ultrasonic nozzle into the gaseous bearer stream. Such a nozzle transforms a liquid flux into a spray of ultrafine droplets. In this way moieties with low vapour pressure are introduced into a carrier gas. This method is as well advantageously applied for moiety with decomposition temperature lower than vaporisation temperature.

In an embodiment of a reactor, which can be used in a production complex, a feeder used for moieties can feed a metal compound like a metal carbonyl compound or a pentandionato-metal compound into the reactor. The metal can be copper or aluminium or any other metal that can be an element of this compound. The feeder of gas, like heating gas or moiety, is in connection with the inner volume of the reactor. At least one feeder, preferably a plurality of feeders is reaching inside the reactor, especially with an extension. In one example, at least one feeder, preferably a plurality of feeders is reaching inside the dissociation chamber of the reactor. The feeder extension is located at a distance to the wall of the reactor. The end of the extension of the feeder that is releasing gas into the reactor is not in touch with the reactor walls. The first feeder has an extension, which reaches into the inner volume of the reactor. The feeder extension is not mounted to the reactor body but to the feeder. The extension of the feeder provides a gas confinement inside the reactor. A gas confinement limits the expansion of gas in at least one direction. The extension of the feeder can be a nozzle with a channel. In the case of a moiety feeder the channel is preferably a cylindrical channel providing a transition of a supply conduit cross-section, which can be named a first cross-section, to an exit cross-section, through which the moiety enters the reactor, which can be named a second cross-section. The exit cross-section of the feeder extension is smaller than the supply conduit cross-section in the case of a moiety feeder. The exit cross-section and preferably the supply cross-section of the feeder are located inside the reactor. The confinement of the extension supports a velocity component of the gas in a direction into the reactor thus forming the shape of a beam or flow of the moiety inside the reactor. Velocity components perpendicular to that direction are suppressed by collisions of gas molecules in the feeder extension with the confining wall of the feeder extension. A directed flow of moiety into the reactor is formed, which is ideally not spreading out to the side walls of the reactor.

In another embodiment also a second feeder can comprise an extension that reaches into the reactor. The extension can also reach into the dissociation chamber. The extension is especially useful, when it is facing the first feeder. The extension of the first feeder can be located at the moiety decomposition zone or at least be facing the decomposition zone. This extension has a flow through connection with the conduit of the second feeder. The extension can also be mounted to the mixing head, but preferably not to the reactor body, like the side walls of the reactor. The extension of the second feeder has the form of a fluid confinement e.g. for a hot gas. The extension is preferably made of a material with low heat conductivity, like glass. This extension is a channel, which is not entirely enclosing the flow of gas. The extension can have the shape of a cylinder with an oval or circular cross-section that comprises a longitudinal cut, like a slit through the cylinder wall, on one side. The extension can also have the form of a cylinder with a rectangular cross-section that is open over its entire length either parallel to one side of the rectangle or with an angle between 0° and 45° in respect to one side of the rectangular cross-section. The so called "cut" structure preferably reaches over the full length of the extension, like the full length of the cylinder. However, also a feeder extension having at least one open section, preferably a plurality of open sections can direct the fluid within the reactor. Therefore the second feeder comprises a transition from a section having a first, circular cross-section, like a cylinder, which can also be named the supply cross-section of the conduit, to a section of a feeder extension with a second cross-section. The second cross-section can have the shape of a letter "U", or a letter "V". Also a cross-section based on the shape of a letter "C" or a Greek letter "v" or combinations of such cross-sections can be used. In such a case the opening of the slit or "cut" can be narrower than an inner diameter of the cross-section. This shape enhances the distribution of fluid over a ring, by scattering or directing fluid elements back into the inner space of the extension of the second feeder. The cross-section of the extension of the feeder can have one dimension which is wider than a diameter of the supply cross-section of the feeder. The extension can be bent in a toroidal circle. The end of the extension is facing the beginning of the extension along a circular curvature of the feeder extension. Thus the extension can have the outer shape of a coil, preferably having a single turn. The opening slit in the extension, preferably along the full length of the extension, is facing the centre of a circle. The end of the extension and the beginning of the extension, preferably having the same cross-section, can be attached to the second feeder, in particular to the opening of the conduit. The second feeder extension provides a confinement that is wider than the confinement provided by the extension of the first feeder or moiety feeder. The extension of the second feeder confines a flow of heating fluid, like hot gas, in an area inside the reactor, in which the decomposable moiety is fed. The extension is reflecting heating fluid onto a circular flow path. In another embodiment, one feeder extension is in flow through connection with a plurality of feeder conduits for heating fluid, each conduit providing a fluid to the feeder extension. Preferably, least one conduit is leading hot gas into a second feeder extension.

One side of the extension of the second feeder forming a toroidal channel is preferably connected to a guiding plate. The second feeder can comprise a guiding plate for hot gas or another heating fluid. The guiding plate can also be described as an extension of the second feeder. The guiding plate has a receiving aperture for a moiety feeder in the form of a hole in the centre. The hole can be disposed around the first feeder. One side, which may be named second side of the toroidal channel of the second feeder extension, remains open. The second feeder extension is open towards the inner volume of the reactor, in particular over the full length of the extension. The guiding plate protects the first feeder from heating gas. The guiding plate helps to direct the fed gas into the reactor. The confinement of gas inside the reactor is further provided by the guiding plate for heating gas. The guiding plate is reflecting heating gas on a flow path along the axis of the reactor. One advantage of a configuration of two feeders, as described, over other feeder arrangements is the formation of a high density interaction zone for gases fed by the two different feeders into the reactor for decomposition of the moiety. Thermal energy or heat is transferred from the hot gas to the moiety gas. No additional, e.g. radiating, source of energy is required. In addition, the interaction zone is not affected by reactor walls.

An embodiment of a production complex with an educt supply comprises a safe and reliable handling unit for moieties. No in-situ synthesis of moiety in required. The moiety used for feeding can be delivered to the production complex and a transfer container with moiety can be connected. The moiety from a reservoir in a transfer-container can enter into the educt supply unit. The transfer container comprises at least one valve. The valve of the transfer container is connectable to the educt supply unit. In connected state, the conduit connecting the valve of the transfer container with a valve of the educt supply unit forms the connector sub-unit. Before the valve of the transfer container is opened in order to release the moiety into the educt supply, the educt supply, in particular the connector sub-unit, is cleaned. Cleaning is carried out by means of flushing with inert gas from a gas source and/or evacuation with a vacuum pump through at least one valve of the educt supply unit. The moiety and the moiety feed line are protected from any exposure to air or other chemicals that could degrade the quality of the moiety and thus degrade the quality of the nano-particles produced. Therefore the state of pristine purity of the moiety, as specified by the producer of the moiety, is maintained. Another advantage is the fact that a specified pure reservoir of moiety gives exact control over the flow rate of decomposable moiety, which can be an advantage for the growth of nano-particles, in particular for the size dispersion of particles. In addition good control over the flow rate of moiety also stabilizes the production rate of nano-particles, e.g. when deposition on a continuous film or an endless tape substrate is required, in order to provide a constant product quality. Also the total amount or batch size of nano-particles produced can be controlled by means of an exchange of suitable transfer-containers of moiety, in particular without interruption of the production process.

Furthermore, a continuous collection unit for continuously collecting nano-particles on clean surfaces can be used as a component of a production complex. This unit can be located at a separation stage of the production complex. A continuous collection unit can be disposed at reactor bottom, e.g. in the place of a first particle trap. A clean surface is a surface that has not been exposed to impurities or particles prior to the deposition of a controlled layer of nano-particles. Nano-particles are deposited on a clean surface with a specified density of nano-particles. Such a unit for continuously collecting nanoparticles can also be located in the place of a second particle trap, e.g. as an embodiment of a particle trap like the second particle trap. Particularly small size nano-particles can be continuously collected on a clean substrate surface, when a continuous collection unit takes the place of a particle filter unit, forming the third separation stage. The continuous collection unit can comprise a particle filter. A continuously replaceable particle filter can be a collector for nano-particles. A continuously replaceable particle filter can be a "sol" or "gel" film, meaning a material of viscosity, on a surface, which is moving. Such a substrate can be transported by a mechanism through the force of gravity. A continuous collection unit for nano-particles on clean surfaces preferably comprises a transport mechanism for clean surfaces especially comprising a transport velocity control mechanism. The transport mechanism moves a substrate providing a surface for deposition, from a position "I", which is a storage position, where the surface is protected from any deposition, to a position "II", which is a collection position, where nano-particles are deposited on the clean surface of the substrate and on to a position "III", which is a second protection position or a processing position. The transport mechanism can move the substrates in steps with a size of an area of deposition, but a transport mechanism preferably moves the substrate continuously. Deposition and/or collection of nano-particles on the substrate surface is carried out continuously. The size of deposited nano-particles can be controlled by means of nano-particle production parameters. The size of the nano-particles can also be pre-determined by means of a separation stage. The density of continuously collected particles can be controlled e.g. by means of gas flow or production rate. The density of the nano-particles can also be determined by means of a transport velocity of the transport mechanism for the clean substrate. Another feature of a unit for continuously collecting nano-particles can be a spray coater for processing of deposited nano-particles. The spray coater is covering the deposited nano-particles having a controlled density on a surface with a vapour forming a film for a protection layer, e.g. a resin, over the surface of the substrate. By means of using a spray coater, nano-particles can be protected against exposure to any potentially quality-degrading environment, like air.

In another embodiment of a production complex the educt supply unit and moiety feeder, preferably also the mixing head and especially the reactor are made of an opaque material, or at least of a material that is coated by a film, which shields the decomposable moiety from exposure to light, in particular from infrared light, so that the decomposable moiety cannot be degraded by energy provided through electromagnetic absorption in particular absorption of light from heat lamps or scattered laser light. Such light sources could for example be operated in the vicinity of the production complex but for other purposes. In case chemical additives are required to be added to the decomposable moiety, e.g. for production of chemically functionalized nano-particles, in particular in the case of photosensitive additives, protection from exposure to light can inhibit photoreactions of the moiety before the moiety enters the decomposition zone of the reactor. In this way the quality of the nano-particles produced by using the heating gas decomposition method can be improved.

Figure 11:
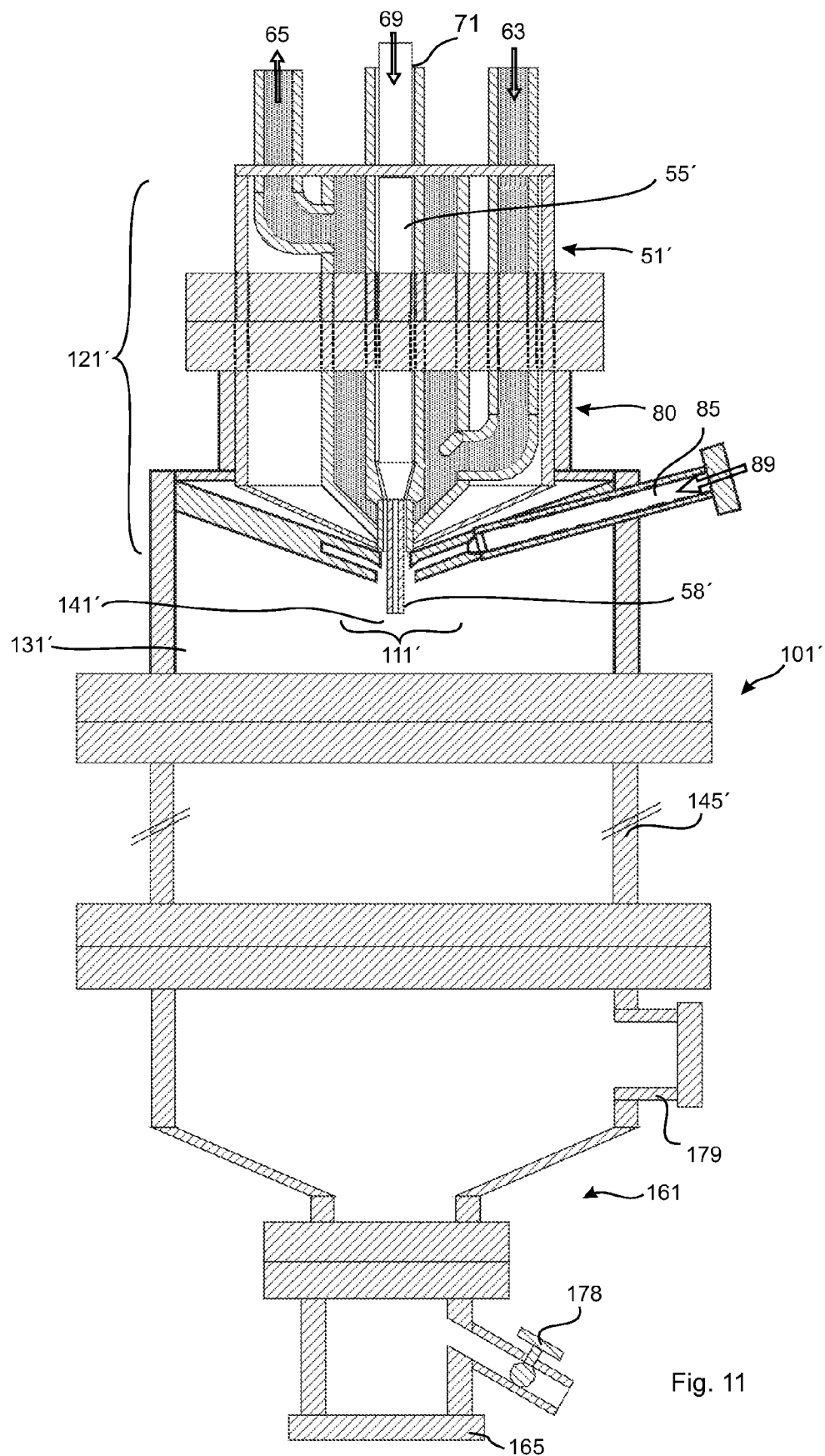
FIG. 11 is a schematic side view cross-section of a reactor combining components from FIG. 2 and FIG. 9.
Figure 12:
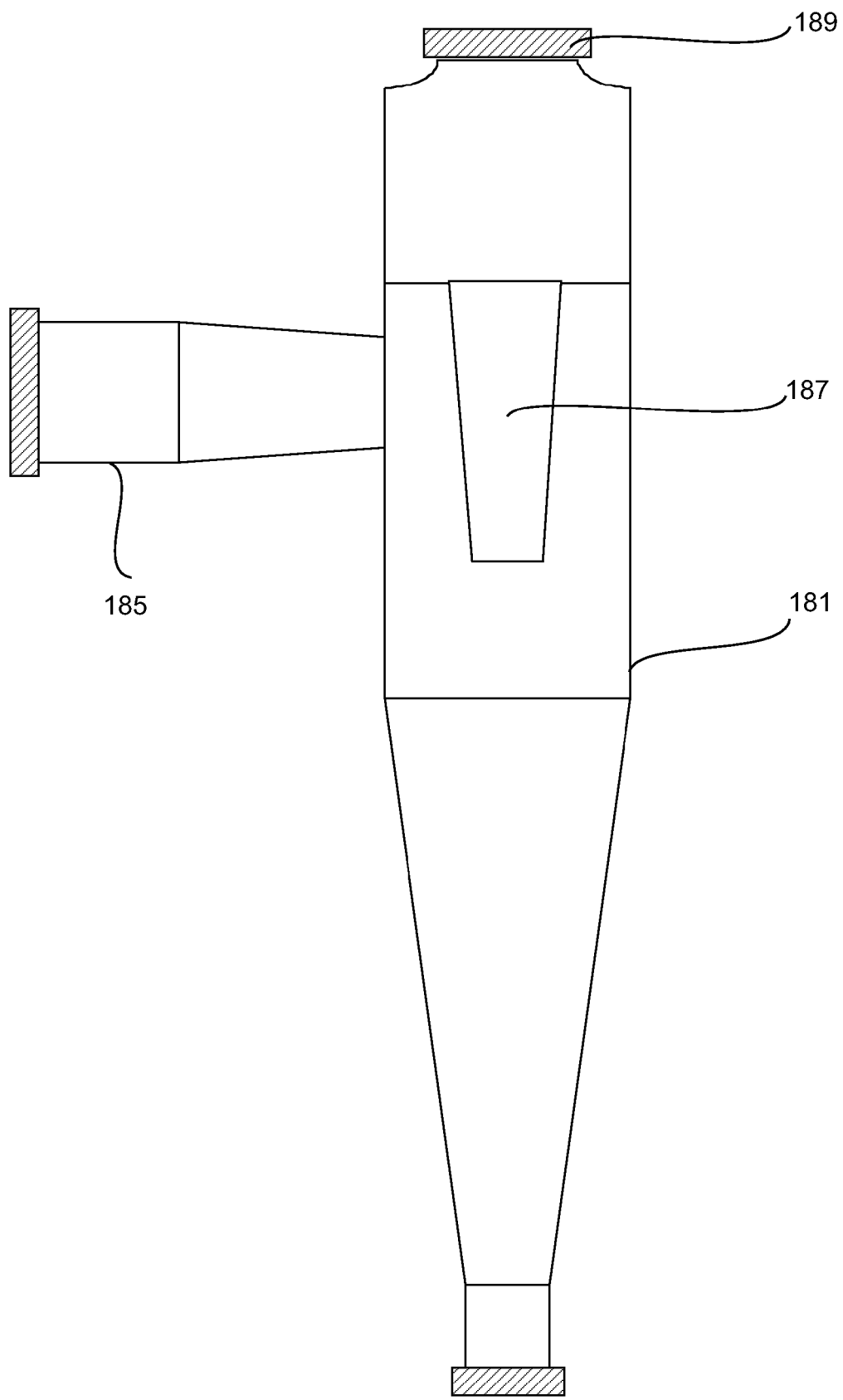
FIG. 12 is a schematic side view cross-section of a cyclone device for storage or separation of nano-particles of metal.
Figure 13:
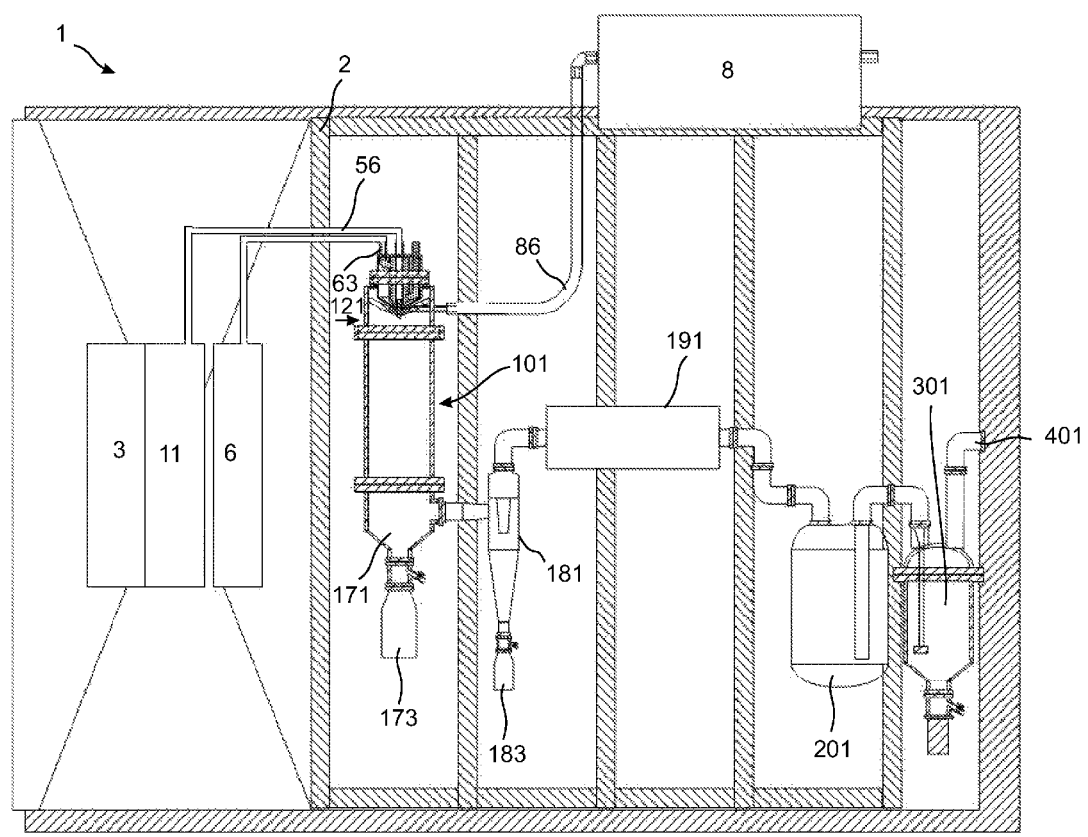
FIG. 13 is a production complex including components of FIG. 11 and FIG. 12.
Figure 14:
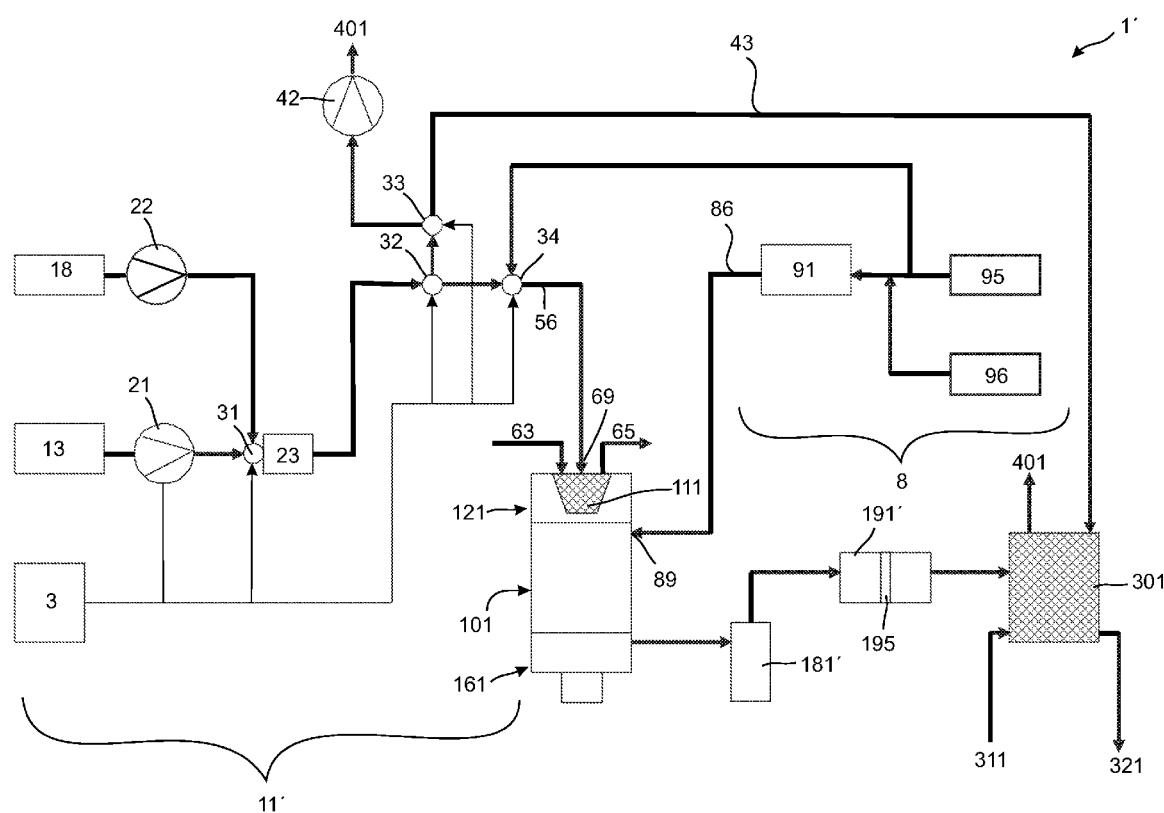
FIG. 14 is a schematic diagram of a production complex with reactor from FIG. 10 and a moiety pump.
Figure 15:
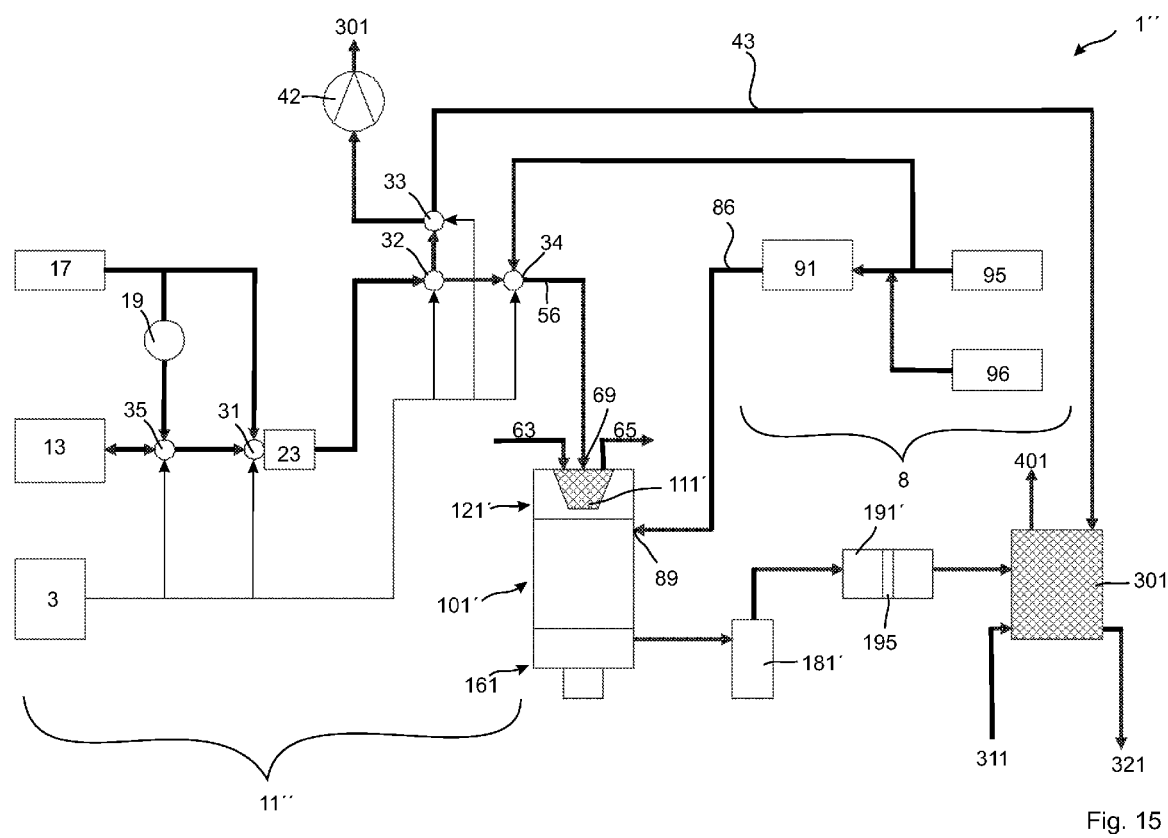
FIG. 15 is a schematic diagram of a production complex with a bearing gas pressure control and reactor from FIG. 11.
Figure 16:
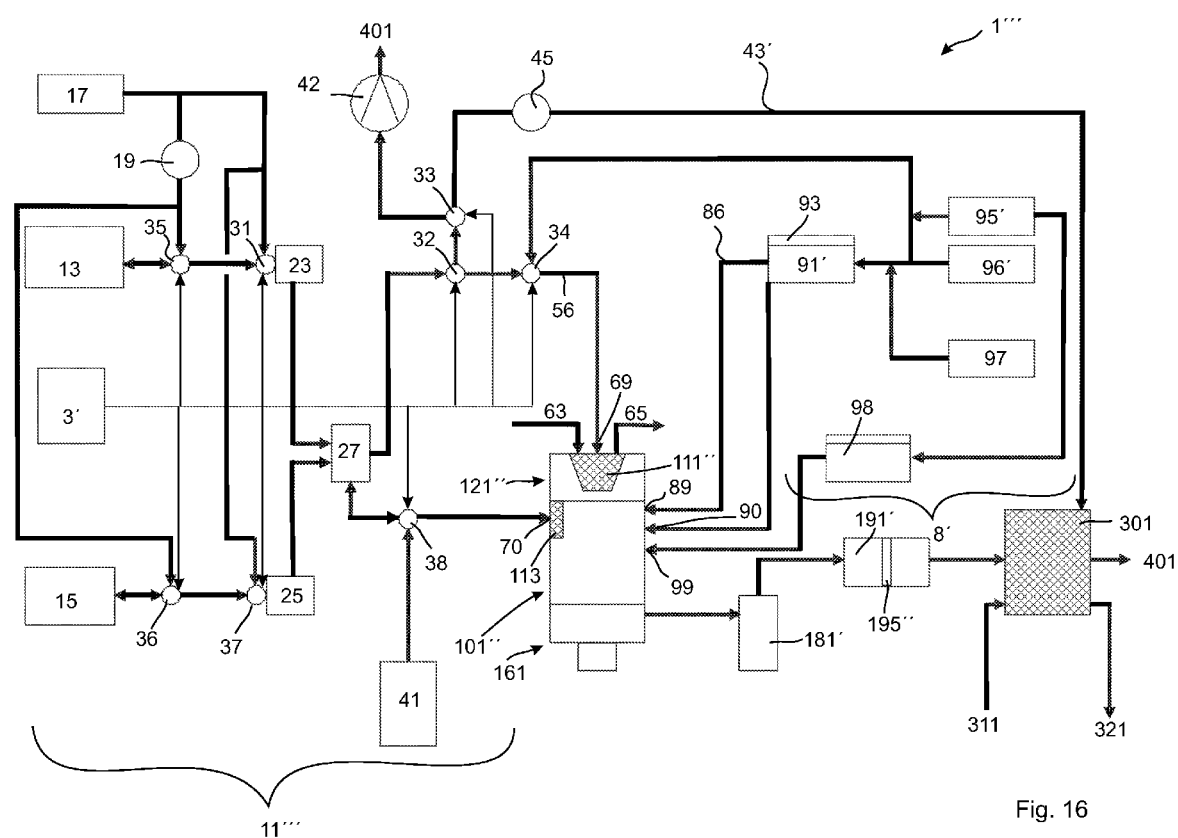
FIG. 16 is a schematic diagram of a production complex with a bearing gas pressure control, reactor from FIG. 11, equipped with additional devices for handling at least two different moieties.

Favourable designs of this invention of a production complex and a reactor for the production of nano-particles of metal are shown in FIGS. 1 to 16. FIGS. 1 to 9 illustrate preferred designs of components of a reactor, of which two embodiments 101 and 101' are shown in detail in FIGS. 10 and 11, respectively. FIG. 12 shows an example of an additional separation stage 181 used for size separation of nano-particle products. A schematic overview of the production complex 1 is given in FIG. 13. FIGS. 14 to 16 are schematic diagrams illustrating in particular gas lines and moiety handling units in the operational systems of the favourable production complexes 1', 1", 1'" arrangements used for the production of different metal nano-particle morphologies.

Moiety injector 51 of FIG. 1 is built with a housing 54 on a flange 53. Injector 51 of FIG. 1 also comprises a first feeder 55 in the form of conduit 57, through which a moiety feed 69 is fed through nozzle 58 into a reactor. The position of the flange 53 on the moiety injector housing 54 determines the seating depth of the first feeder nozzle 58 in a reactor. The first conduit 57 is surrounded by a cylindrical injector cooling bath 61 filled with cooling liquid like cooling oil indicated with the black dotted area. In this flow-through arrangement cooling liquid-in 63 passes to cooling liquid-out 65, with supply tubes connected to moiety injector 51 not shown. The cooling liquid-in 63 tube directs the flow of liquid like cooling oil towards the first feeder nozzle 58, which is cooled down to a preset temperature. In this configuration the cooling liquid encircles the nozzle 58 orifice almost entirely. After flowing along the first conduit 57 in the direction away from the first feeder nozzle 58, the cooling liquid leaves the cooling bath 61 through cooling liquid-out 65. It should be noted that cooling liquid-in 63, cooling liquid-out 65 and cooling bath 61 are typically used for moiety injector 51 temperature stabilization in metal nano-particle production. Several metal organic compounds, in particular compounds with decomposition temperature between 140° C. and 500° C. are preferably fed through first feeder 55 at elevated temperature between 20° C. and 450° C. For this purpose the described cooling system is used as a heating system where the cooling bath 61 becomes a heating bath through the temperature of the provided liquid, which, in such applications, typically is heating oil. The moiety injector 51 of FIG. 1 is e.g. built in the reactor 101 of FIG.

10, where it is used to feed metal organic compounds into the reactor 101. The broken line in FIG. 1 parallel to the injector flange 53 indicates the plane of the schematic cut of the moiety injector 51 in FIG. 2.

Figure 2:
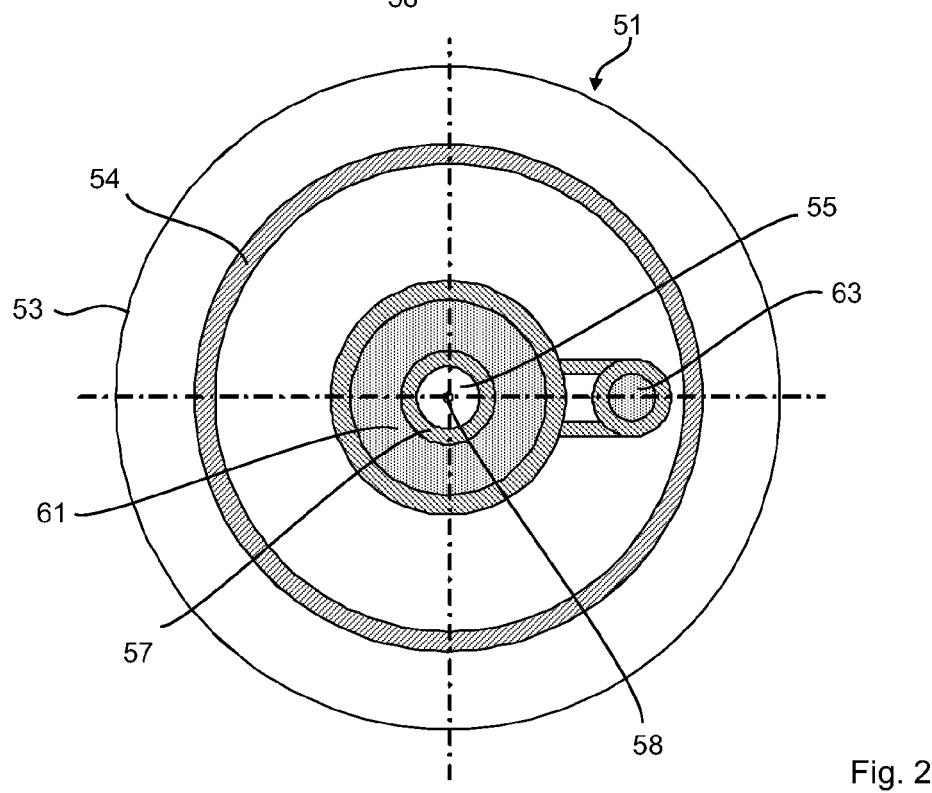
FIG. 2 is a schematic top view cross-section of the carbonyl injector in FIG. 1.

The outer circle of FIG. 2 represents the injector flange 53 of the moiety injector 51 that is followed by a concentric hedged circle of the injector housing 54 towards smaller radii. The next concentric hedged circle with an even smaller radius is the outer cylindrical wall of the injector cooling bath 61, where the cooling liquid is represented by a dotted circular area enclosing the conduit 57 of the first feeder 55. In the centre of this circular configuration, a small circle indicates the opening of first feeder nozzle 58. When built in the production setup of reactor 101 in FIG. 10, this nozzle 58 is pointing along the central axis of the reactor 101, the axis then being in the direction perpendicular to the two broken lines crossing each other in the centre of FIG. 2. The cooling liquid-in 63 conduit shows in the plane of FIG. 2 mounted to the right hand side of the outer wall of injector cooling bath 61.

FIG. 3 gives a second advantageous design example of a moiety injector 51' for the moiety feed 69. The design of this injector 51' in FIG. 3 is similar to FIG. 1, comprising an injector flange 53', injector housing 54', injector cooling bath 61' with cooling liquid-in 63 and cooling liquid-out 65. The first conduit 57', however, became a component of an exchangeable flask 71 thus forming the first feeder 55'. Injector 51' furthermore comprises reception hole 75 and seat of flask 78 for flask 71, in contrast to the injector 51 of FIG. 1 without such features. In this FIG. 3 configuration of the injector 51' the first feeder nozzle 58' is the thin end orifice of the flask 71 that reaches into a reactor with an insertion depth 77 depending on the specific dimensions used for building the flask 71. The broken line parallel to injector flange 53' of FIG. 3 indicates the location of the cutting plane for the schematic top view of injector 51' in FIG. 4.

This injector 51' cross-section in FIG. 4 shows injector flange 53', injector housing 54', injector cooling bath 61' and cooling liquid-in 63 corresponding to the cross-section FIG. 2. Mounted at the left-hand side of cooling bath 61' in FIG. 4, the cooling liquid-out 65 conduit can be seen as well, which is no part of cross-section FIG. 2. At the crossing point of the two broken lines in FIG. 4, the inner circle with smallest radius shows the reception hole 75 for the thin end of flask 71 in FIG. 3. The reception hole 75 in FIG. 4 is surrounded by the seat of flask 78 which is a conical seat on the inner wall of the injector cooling bath 61'. The crossing point of the two broken lines in FIG. 4, is located on the central axis of the assembled reactor 101' in FIG. 11 comprising moiety injector 51', particularly used for metal carbonyl and bearer gas mixtures The schematic embodiment of flask 71 used with the injector 51' of FIG. 3 and FIG. 4 is shown in FIG. 5. This flask comprises the first conduit 57', the flange of seating flask and reception hole 79 and the first feeder nozzle 58'. Such a flask is entirely made of glass. In a preferred embodiment of flask 71 only the conduit 57' is made of a transparent chemically inert material like glass for optical inspection of the inside. The flange 79 and the nozzle 58' are made of steel. The metallic components of flask 71 improve the equilibration of heat between moiety passing through flask 71 and cooling bath 61' of the injector 51' where flask 71 is inserted. However, flasks of other preferred designs made of adequate materials can be used in injector 51' provided that the largest flask diameter 73 is suitable for injector 51'. The distance between the flange of seating flask 79 and the nozzle opening 58' at the small side of the flask 71 defines the FIG. 3 insertion depth 77 of the flask 71 in a reactor. By one aspect the distance between insertion depth 77 of nozzle opening 58' from the moiety injector 51' and the hot gas injector 80, assembled in reactor 101' of FIG. 11 is important for the reactor 101' gas flow and reaction dynamics. Different flasks providing insertion depths deeper than depth 77 from FIG. 3 are used for the production of selected morphologies of nano-particles of metal. Some species of nano-particles however require an insertion depth that is less deep than depth 77 of flask 71. The capillary forming the first feeder nozzle 58' of the flask 71 has a preferred inner diameter between 0.8 mm and 1.6 mm. When an inner diameter like a diameter of 0.6 mm is used with moiety pressures like a pressure of about 1500 hPa or higher, the outer diameter is at least 1.2 mm, for stability reasons, but not more than 10 mm, preferably not more than 6 mm more preferably less than 4 mm, most preferably less that 2.4 mm. Other examples of first feeder nozzles have an inner diameter of the capillary of 1.1 mm and an outer diameter of 1.9 mm. Other preferred production processes require first feeder capillary inner diameters between 0.2 mm and 2.6 mm, the larger diameters of about 1.8 mm particularly being used for pressurized moiety feed 69 with feeding pressure below atmospheric pressure of about 1000 hPa, in particular between 1 hPa and 100 hPa.

Figure 6:
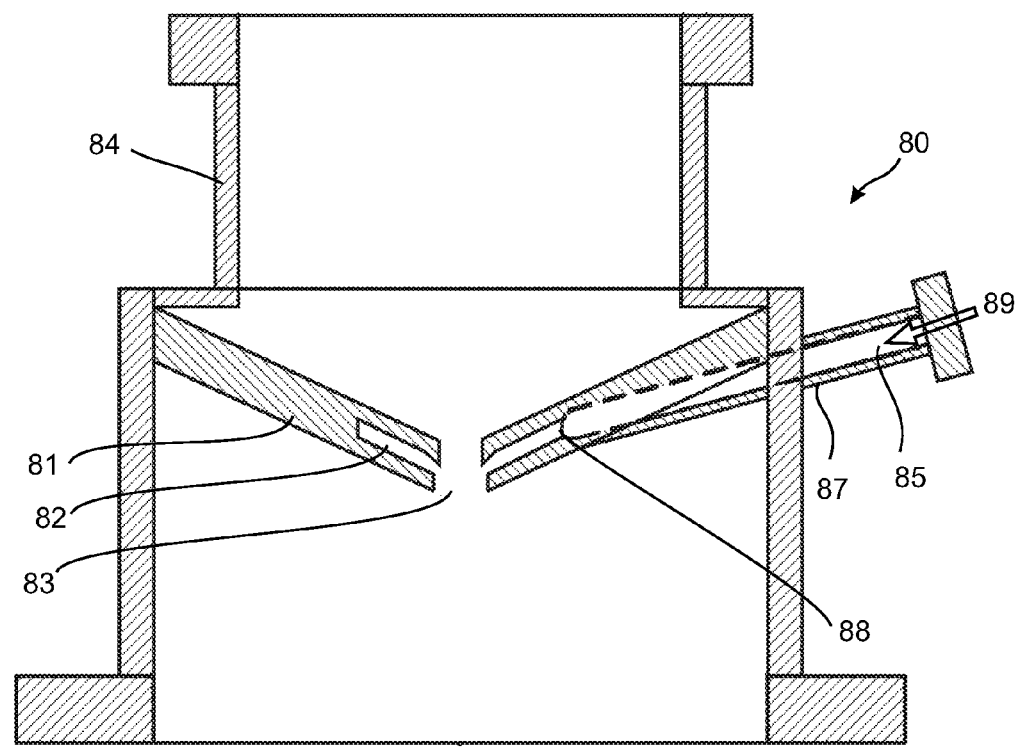
FIG. 6 is a schematic side view cross-section of a hot gas injector for feeding the pre-heated gas into a reactor.

The embodiment of the hot gas injector 80 of FIG. 6 comprises the injector housing and flanges 84 and the hot gas guiding plate 81 with the hot gas guiding slot 82. The first heating feed 89 is fed into the second feeder conduit 87 comprising the second feeder 85. The end of the second feeder conduit 88 releases the hot gas into the hot gas guide slot 82. The hot gas guide slot 82 is a groove in the hot gas guide plate starting from a central guiding plate aperture 83 that is a borehole through the tip of this conically shaped plate 81. This borehole has a smaller diameter at the inner side of the conical plate 81 and a larger diameter at the outer side of this plate, which, when built in reactor 101' of FIG. 11 is facing towards the reactor bottom 161. This asymmetry of the aperture 83 in FIG. 6 supports the flow of gas into a reactor. The diameter of the guiding plate aperture is made to receive the thin end of flask 71 from FIG. 5 with the first feeder nozzle 58'. In another embodiment of the hot gas injector (not shown) the end of the second feeder conduit is built as a nozzle with adjustable flow-through diameter that is controllable by external action.

Figure 7:
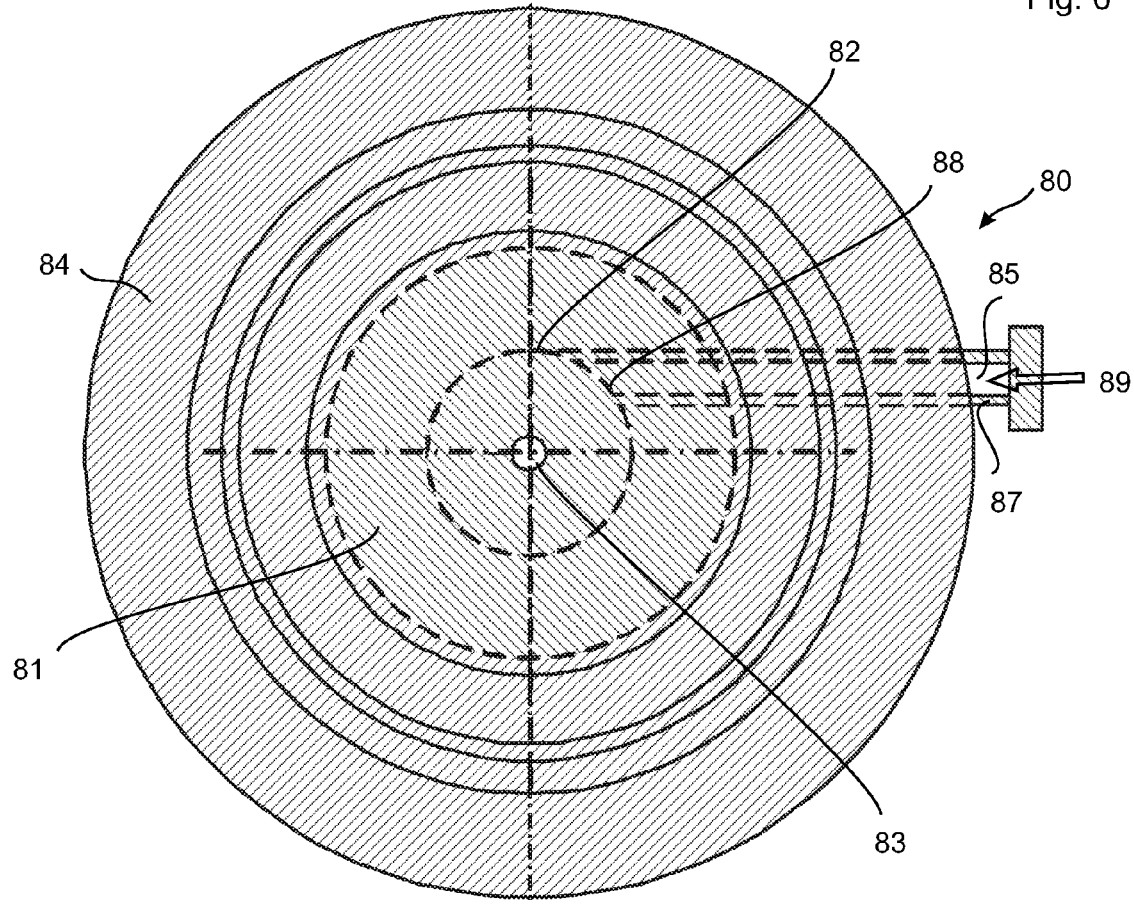
FIG. 7 is a schematic top view of a hot gas injector.

The schematic top view of the hot gas injector 80 from FIG. 6 is given in FIG. 7. The guiding plate aperture 83 of hot gas guiding plate 81 is placed in the centre of the so far concentric arrangement of this hot gas injector 80 with hot gas injector housing and flanges 84. The second feeder conduit 87, comprising the second feeder 85, however, is implemented such that the first heating feed 89 enters the hot gas guiding slot 82 in tangential direction. Under operational conditions a moiety injector like the injectors 51 or 51' with first feeder nozzle 58 or 58' shown in FIG. 1 or FIG. 3, respectively, is seated on the hot gas injector housing and flanges 84 of FIG. 7 with the first feeder nozzle 58 or 58' of FIG. 1 or 3 pointing towards or through the central hot gas guiding plate aperture 83 of FIG. 7. Such configurations are used in reactors like the reactors 101 or 101' from FIG. 10 or 11, respectively. As shown in FIG. 7, the first heating feed 89 is directed to a point at a distance from this axis near the largest diameter of the hot gas guiding slot 82. This point is not located on the central axis defined by the perpendicular direction at the crossing point of the two broken lines in the centre. In this way a whirling stream of gas is created in an operating reactor. The hot gas injector 80 gas stream according to FIG. 7 is whirling counter clockwise. In a different embodiment of a hot gas injector (not shown) the gas stream is whirling clockwise. The whirling stream through a reactor like the reactors 101 or 101' from FIGS. 10 and 11, respectively, thus depends on a number of parameters like the angle of the hot gas guide plate 81 cone, the width and/or the diameter of the hot gas guiding slot 82, the diameters of the guiding plate aperture 83, the position of the first feeder nozzle like the nozzle 58' of the moiety injector 51' in FIG. 3, the displacement of the FIG. 7 second feeder conduit end 88 opening in the hot gas guiding slot 82 with second feeder conduit 87 from the radial arrangement, and the pressure of the first heating feed 89.

Figure 8:
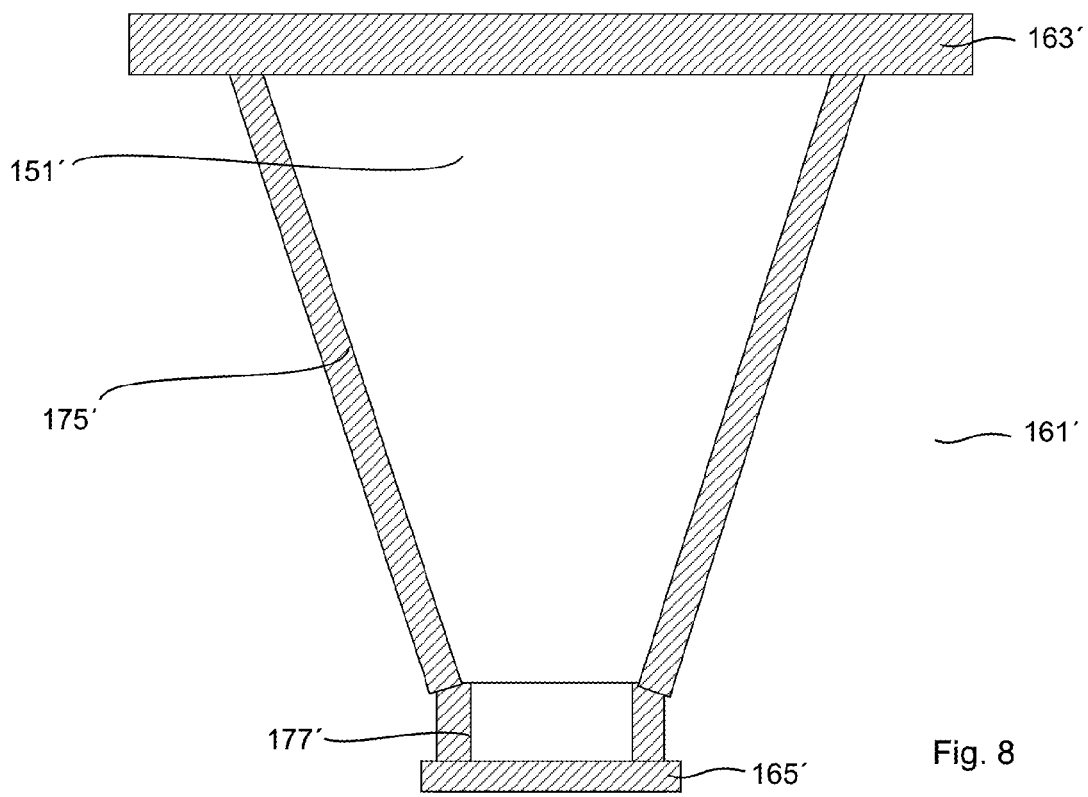
FIG. 8 is a schematic side view cross-section of a reactor bottom.

FIG. 8 shows a first embodiment of a reactor bottom 161' comprising a conical structure with the reactor flange 163' at the wider end and the trap flange 165' at the narrow end. Reactor bottom 161' is mounted with flange 163', to a reactor on the opposite side of a gas injector configuration like an assembly of the moiety injector 51 and hot gas injector 80 configurations shown in FIG. 1 and FIG. 6, respectively, mounted together. Therefore reactor bottom 161' built in a reactor is facing the stream of gas with reaction products such as nano-particles of metal. Under production conditions the symmetry axis of reactor bottom 161' is part of the central axis of a reactor. This reactor bottom 161' includes a precipitation zone 151', in which nano-particles of metal carried by the flow of gas from a reactor, which preferably is a whirling flow like in the reactors 101, 101' of FIG. 10, 11 respectively, are separated. By one aspect, nano-particles can be separated radially due to centrifugal forces in a whirling stream. Different particle masses therefore are deposited in different places of the conically shaped collecting wall 175' or the collecting tube 177'. Particles of higher mass, which are particularly subjected to forces of gravity, will be collected in a particle trap (not shown) attached to the trap flange 165'.

Figure 9:
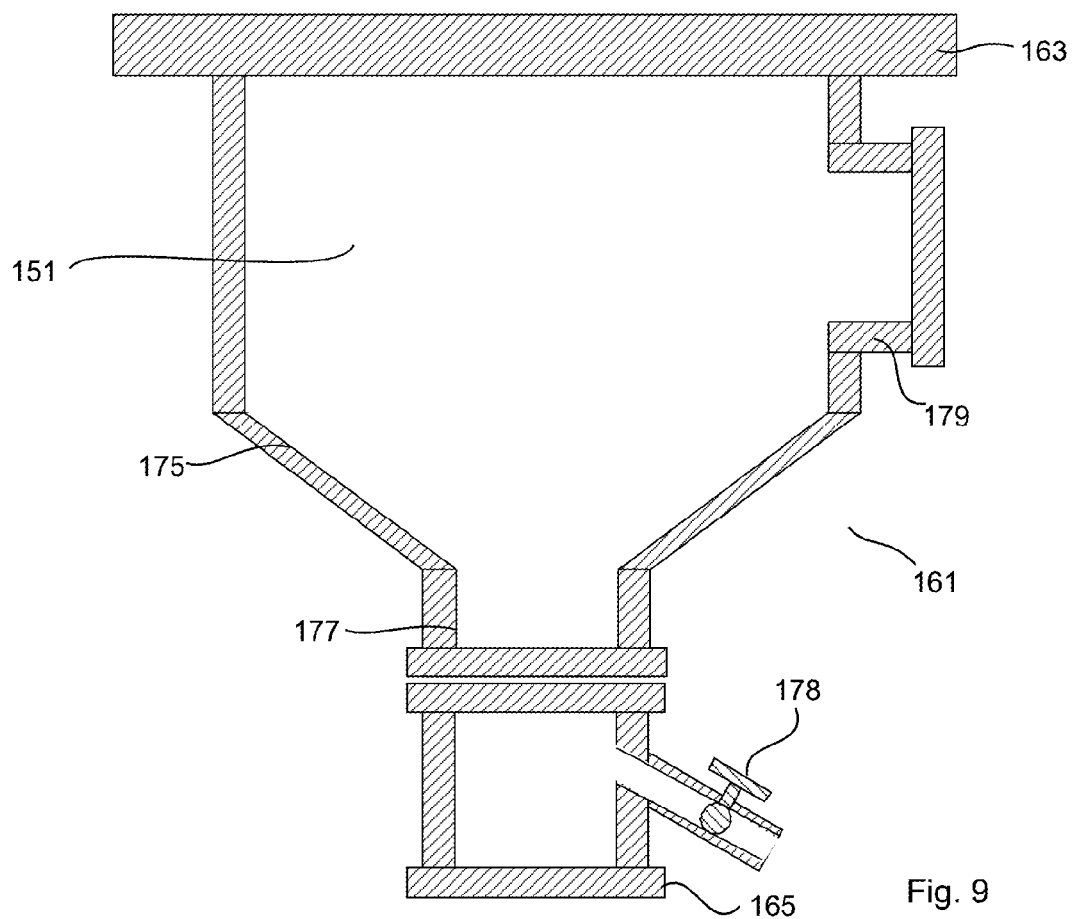
FIG. 9 is a schematic side view cross-section of a reactor 2-way-bottom.

Another embodiment of a reactor bottom 161 is shown in FIG. 9. In this embodiment the reactor bottom 161 comprises a conical wall collector 175, a collecting tube 177 and an exit conduit 179. An extended collecting tube 177 is attached towards trap flange 165. This extension comprises gas extraction valve 178 mounted to the extension in a sideways conduit so that a vacuum can be drawn through gas extraction valve 178 in order to support gas stream through reactor bottom 161 and nano-particle collection through the precipitation zone 151. When mounted with reactor flange 163 in the production complex 1 of FIG. 13, this reactor bottom 161 forms a first separation stage 171 with a first particle trap 173 attached to it. The gas flow with the fraction of nano-particles not collected leaves reactor bottom 161 of FIG. 9 through the exit conduit 179 for further use or separation.

Figure 10:
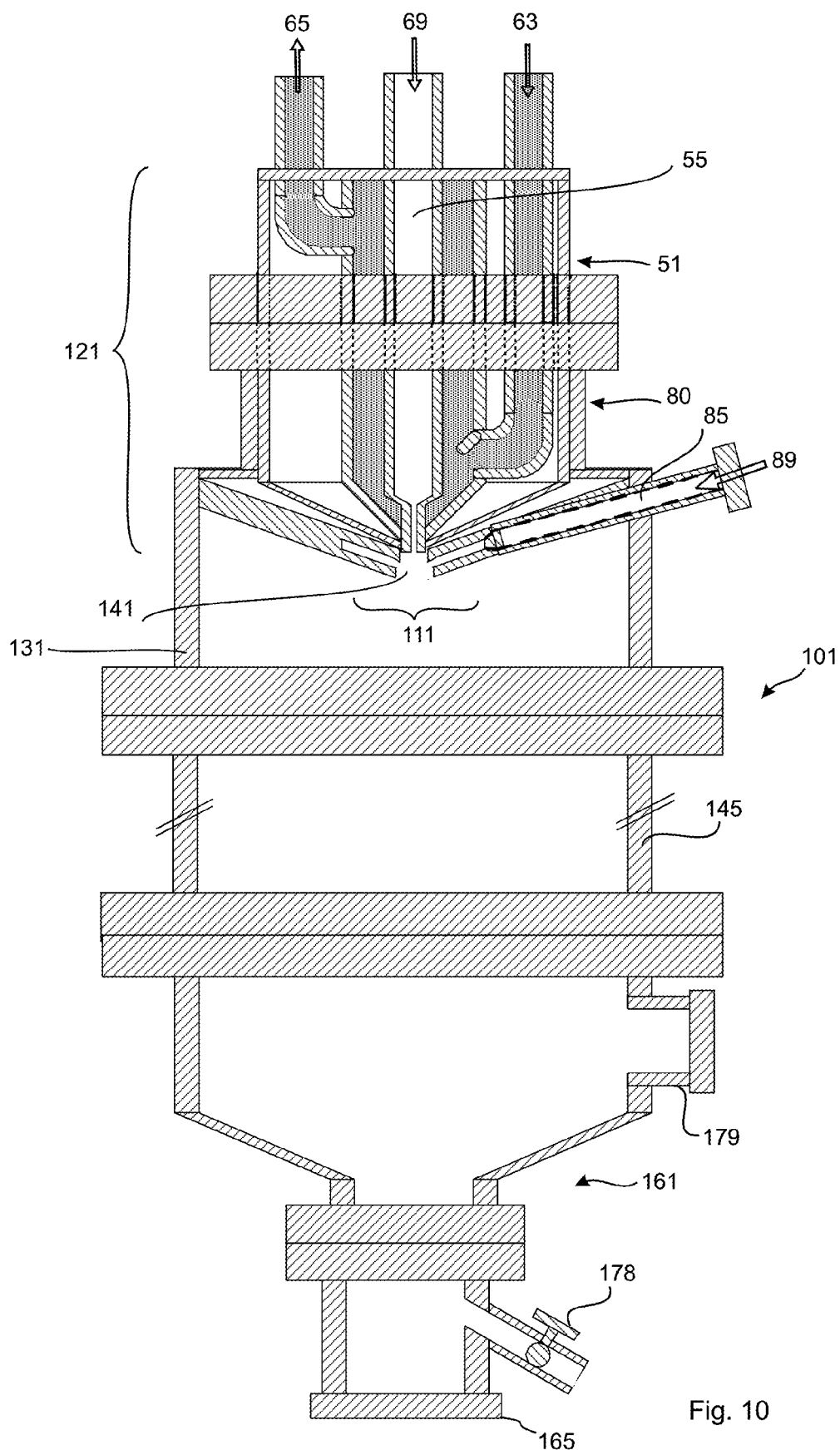
FIG. 10 is a schematic side view cross-section of a reactor combining components from FIG. 1 and FIG. 9.

FIG. 10 shows the mounted reactor 101 comprising a first distribution funnel 111 for gas into reactor 101 located in the mixing head 121 of the reactor 101. The distribution funnel 111 releases the moiety feed 69 through the first feeder 55 and first heating feed 89 through the second feeder into the mixing head 121 facing the dissociation chamber 131 with a decomposition zone 141 from where the gas flows through the sprawled reactor body 145. The reactor 101 further comprises the reactor bottom 161 of the embodiment shown in FIG. 9 with a trap flange 165 where further components (not shown) are attached in order to collect nano-particles. Such components in one embodiment not shown comprise a facility for continuous deposition of nano-particles of metal on substrates passing sideways at a small distance of less than 50 mm from trap flange 165 under the reactor 101. The first distribution funnel 111 comprises components of moiety injector 51 from FIG. 1 used for injection of metal organic compounds and the hot gas injector 80 from FIG. 6. Cooling liquid-in 63 and cooling liquid-out 65 provide controlled stabilized temperature for first distribution funnel 111 components exposed to a stream of gas, in particular pure moiety.

The reactor 101' shown in FIG. 11 is to some extend equivalent to the reactor 101 in FIG. 10, however there is the striking difference in FIG. 11 that the carbonyl moiety injector 51' from FIG. 3 has been installed. This moiety injector 51' in FIG. 11 comprising a first feeder 55', which is a carbonyl feeder using the flask 71 for feeding metal carbonyls in a bearer gas into the reactor 101'. In this reactor 101' set up, the first feeder nozzle 58' representing a section of the central axis of the reactor 101' reaches through the level of the hot gas injector 80 into reactor 101' thus forming a flow body of cylindrical shape within the configuration of the hot gas injector 80 in a way that the gas from the second feeder 85, which is the hot gas feeder, performs a circular flow around the first feeder nozzle 58' under operation of reactor 101'. When this circular flow from the first heating feed 89 expands in the mixing head 121' of reactor 101', the configuration of the first feeder nozzle 58' combined with hot gas injector 80 acts as a distribution funnel 111' by mixing the moiety feed 69 of a metal carbonyl mixed with a bearer gas with the first heating feed 89 of a pre-heated inert gas. The mixture of the two said gases is brought about by the Venturi effect of the expanding first heating feed 89, which creates an under pressure in the mixing zone of mixing head 121. The mixing zone thus becomes the decomposition zone 141'. In the decomposition zone 141', the first heating feed 89 providing the thermal energy decomposes metal carbonyls of the moiety feed 69 preferably used. In some applications other metal organic compounds are fed through first feeder 55' with moiety feed 69 for decomposition in the dissociation chamber 131' and production of nano-particles of metal. The mixed gas feed propagates through the sprawled elongated reactor body 145' in a cyclonic whirling flow while metal nano-particles are formed through aggregation or condensation of metal atoms released from metal carbonyl molecules. Formation of nano-particles of metal may also occur in a process which involves metal carbonyl molecules partly stripped from carbonyl groups through interaction with hot inert gas from the first heating feed 89. After propagating through the elongated cylindrical body 145' of reactor 101' the gas flow carrying nano-particles of metal reaches reactor bottom 161 which is used to collect some nano-particles of metal through the trap flange 165. This process in some advantageous applications is accelerated by a vacuum drawn through 178. Such a configuration of this first separation stage 171 with trap 173 is shown in FIG. 13. In FIG. 11 nano-particles still floating with the gas flow leave the reactor 101' through exit conduit 179. A useful facility (not shown) placed under trap flange 165 in the reactor 101' embodiment involves an automatic apparatus that approaches substrates for deposition of nano-particles of metal to the trap flange 165 from outside the reactor and removes such substrates after deposition subsequently and repeatedly. Such a combination of reactor 101 and substrate exchange apparatus is particularly useful for the serial production catalytic gas purification membranes and filters.

FIG. 12 shows an embodiment of a second separation stage 181 built as a cyclone separator, which receives the gas flow e.g. by being mounted to the exit conduit 179 of reactor 101' in FIG. 11. The gas carrying the nano-particles enters through reception conduit 185 in FIG. 12 into the cyclone separator 181. The body of this cyclone separator 181 has an elongated cylindrical shape with an inner flow body 187. The reception conduit 185 is attached sideways to the second separation stage 181 so that the gas flow enters the second separation stage 181 from a direction that is substantially perpendicular to a central rotational symmetry axis of the cylindrically shaped second separation stage 181. The gas, however, is not directed towards this symmetry axis of the inner flow body 187 but tangentially in the toroidally shaped space between the flow body 187 centred at the symmetry axis and the wall of the second separation stage 181. In this way the metal nano-particles bearing gas stream is directed in a whirling cyclonic flow around this flow body 187. In this whirling flow metal nano-particles are storable for an extended period of time of up to 10 minutes while sedimentation of nano-particles of metal takes place. Such sedimentation is affected under the influence of gravitational force towards the bottom of the cyclonic separation stage 181. Here at this bottom a second particle trap (not shown) like the particle trap 183 of FIG. 13 is attached in order to collect a second fraction of nano-particles of metal. The gas with still floating nano-particles of metal, which are typically of small size like particles smaller than 50 nm, preferably smaller than 20 nm more preferably smaller than 10 nm, most preferably smaller than 3 nm leave the second separation stage 181 through an opening in the flow body of 187 through the exit flange 189 for further processing or collection.

The set up of complex 1 for production of nano-particles of metal is shown in FIG. 13. The components of production complex 1 shown are mounted in a supporting frame 2. Central functional unit is reactor 101 with mixing head 121 and the first separation stage 171. In reactor 101, according to FIG. 10, a first feeder 55 and a second feeder 85 are used to feed the moiety and a heating gas, respectively, through the mixing head 121 into reactor 101. In FIG. 13 the metal organic compound like metal carbonyl or metal carbonyl mixed with a bearer gas is provided by the educt supply 11 through the first feeder line 56 into the first feeder 55 shown in FIG. 10. In FIG. 13 the heating fluid, e.g. a preheated inert gas is provided by the heating fluid supply 8 through the second feed line 86 to the second feeder 85 shown in FIG. 10, from where it enters the hot gas injector 80 of the mixing head 121. In FIG. 13, the cooling liquid, which in this embodiment is cooling oil, is pumped from the cooling liquid supply 6 to the cooling liquid-in 63 of the reactor 101 through a conduit. The cooling liquid like liquid nitrogen or water evaporates in air when leaving the reactor head 121. All supply units but in particular the educt supply 11 are monitored and controlled automatically through the control panel 3.

The first separation stage 171 of nano-particles of metal has a first particle trap 173 attached from the bottom, in which nano-particles of metal of one size distribution are collected. Nano-particles which are not separated from the gas flow in the first separation stage 171 are carried with a gas flow into the second separation stage 181, which in this embodiment of a complex 1 is the cyclonic separator of FIG. 12. In FIG. 13 a second particle trap 183 is attached to the bottom of the second separation stage 181. This particle trap collects nano-particles of metal with a size distribution having an average size smaller than 75%, preferably smaller than 55% more preferably smaller than 30% most preferably smaller than 20% compared to the average size of particles from trap 173. Depending on selected production parameters particle sizes with full width at half maximum distributions of less than 50% preferably less than 20%, more preferably less than 5% of the average particle size of the trapped fraction are readily produced depending on gas flow conditions like conditions specified in Table 1 of this invention.

Nano-particles of metal which are not separated from the flow of gas in this separation stage 181 of complex 1 in FIG. 13 are carried by the flow of gas into a third separation stage 191 containing a particle filter. A size range of nano-particles of metal smaller than 50 nm but larger than 30 nm is collected by filtering the gas from the reactor in this third separation stage 191. Any atoms or particles of metal carried with the flow of gas through this third separation stage 191 are guided into a safety wash bottle 201 where any particles of metal are washed from the flow of gas, which thus purified enters the scrubber 301 unit. The water-cooled scrubber 301 unit separates any metal carbonyl that was not decomposed in reactor 101 from the gas, which is a mixture of carbon oxide, bearing gas, heating gas, and any additionally used process gas by condensation. The thus recovered and purified metal carbonyl can be used again in the educt supply 11 for the production process of nano-particles of metal in reactor 101. The mixture of gas is released from the scrubber 301 through an exhaust 401. In another embodiment (not shown) such exhaust gases are separated, purified, and recycled for future production processes. The carbon oxide in particular from the decomposition of metal carbonyls can be recycled for the synthesis of metal carbonyls. Further use for carbon oxide with impurities comes from oxidation to carbon dioxide using the heat of this exothermic reaction as source of heat for the heating fluid supply 8.

FIG. 14 shows a second embodiment of a production complex 1' as a flow diagram where the flow paths of gases between the sub-units of the production complex 1' is indicated by bold lines and arrows. Such flow paths are typically formed by conduits (not shown). This schematic diagram shows in particular details of the educt supply 11' unit and the heating fluid supply 8 unit shown with the installment of complex 1 of FIG. 13. In FIG. 14, the educt supply 11' contains a first carbonyl source 13 and a bearer fluid source 18. The metal carbonyl from the first carbonyl source 13 is pumped by the carbonyl pump 21 through the first valve 31, which is a 3-way valve, into the first mixer evaporator 23. The bearer liquid from the bearer fluid source 18 is pumped by the bearer fluid pump 22 through the third port of first valve 31 into the first mixer evaporator 23, where heat is applied to the liquid metal carbonyl and bearer liquid mixed therein for evaporation. In this way a mixture of metal carbonyl vapour and a bearer vapour is formed. This educt fluid or moiety is then guided through conduits, passing within the first feed line 56 through second valve 32, fourth valve 34 as the moiety feed 69 through the first distribution funnel 111 in mixing head 121 into reactor 101. The third port of the second 3-way valve 32 connects to a third 3-way valve 33, from where one tube connects to a vacuum pump 42 while the third port from valve 34 is connected via by-pass-line 43 with the scrubber 301. The third port of the fourth valve 34 receives inert gas from the inert gas source 95. While the first carbonyl source 13, the bearer fluid source 18, and the first mixer evaporator 23 are used under production operation of the complex, the other components are also important for aspects of pre-operational processes, like cleaning the inner volume of the first mixer evaporator 23 and the first feed line 56, which in this embodiment is a conduit between the first mixer evaporator 23 and the first distribution funnel 111. All valves 31, 32, 33, 34 and pumps 21, 22, 42 are operated from the control panel 3. Three useful pre-operational procedures for the educt supply 11' are described here:

a) release of any metal carbonyl moiety vapour above atmospheric pressure from the first mixer evaporator 23 and the first feed line 56 through second valve 32 and third valve 33 into the by-pass line 43 and from there into the scrubber 301 for recovery of metal carbonyl. Valve 31 is preferably closed towards all ports in this process;

b) evacuation of feed line 56 and mixer evaporator 23 i.e. the gas volume between the closed valves 31 and 34 through valve 32 and 33 while valve 33 closes by-pass-line 43 and valve 34 closes also the connection to the inert gas source 95;

c) inert gas from inert gas source 95 is used to fill the feed line 56 through valve 34 and this purging gas either is vented into the by-pass line 43 through valve 32 and valve 33 or evacuated through the vacuum pump 42 following procedures described in a) and b).

Such pre-operational purging processes can be applied repeatedly for purification of the moiety feed line 56 when thorough purging is required before a new source of carbonyl 13 or bearing fluid 18 is attached or used with the educt supply 11'. When this purging setup with by-pass-line 43 is used, cleaning of the feed line 56 is carried out without venting through reactor 101 and the metal nano-particle product and separation line into the scrubber 301 thus avoiding introduction of impurities in these units of the production complex 1'.

Further components shown in FIG. 14 are cooling liquid-in 63 and cooling liquid-out 65 for temperature control and stabilization within the first distribution funnel 111. Further on there are the components of the heating fluid supply 8, including the second feed line 86 for feeding the first heating gas feed 89 into the reactor 101. The heating gas supplied by the inert gas source 95 is fed into a heater 91 and from there by means of the second feed line 86 into the reactor 101, precisely into the distribution funnel 111 of mixing head 121. In addition, a process gas like oxygen from a process gas source 96 is fed through the heater into the second feed line 86 in special production processes. In this way process gas and inert gas are forming the mixed heating-process gas for metal carbonyl decomposition and metal nano-particle formation in the reactor. Control valves of the heating fluid supply 8 are not shown. Gases leaving the reactor 101 are guided from the reactor bottom 161, which corresponds to the first separation stage 171 shown in FIG. 13, to the second separation stage 181' comprising a cyclonic separator with gas retention time up to 2 minutes. From there the gas is guided further on to the third separation stage 191' comprising particle filter 195 specified for the wanted size of particles. Such sizes are between 1 nm and 20 nm. After the third separation stage 191' the gas is guided into the scrubber 301 for metal carbonyl extraction with a cooling system running with cooling water in 311 and cooling water out 321. Gases from the scrubber 301 are vented through the exhaust 401.

The third embodiment of production complex 1" with reactor 101' shown schematically in FIG. 15 has identical components regarding the heating fluid supply 8 compared to production complex 1' in FIG. 14. Also second separation stage 181' in FIG. 15, third separation stage 191' with filter 195 and scrubber 301 with cooling water in 311, cooling water out 321 and exhaust 401 are installed in the same configuration compared to the embodiment of the production complex 1' shown in FIG. 14. The educt supply 11" in FIG. 15 however is different from the educt supply 11' in FIG. 14. The FIG. 15 embodiment of the educt supply 11" comprises an additional fifth 3-way-valve 35, which is located between the first carbonyl source 13 and the first valve 31. The third port of this fifth valve 35 is connected via a pressure control 19 unit to the bearer gas source 17. By using pressure from the bearer gas source 17, metal carbonyl from the first carbonyl source 13 is pressed into the first mixer evaporator 23 forming the moiety feed 69 consisting in particular of the bearer gas and metal carbonyl vapour fed into reactor 101'. A particular advantage of this configuration is the reduction of time required for the pre-process purification routines of the first feed line 56 described in the context of FIG. 14 due to the fact that there is no additional component like the carbonyl pump 21 which requires to be purified in complex 1" of FIG. 15. Other components involved in this purification are valves 32, 33, 34, vacuum pump 42, all controlled by the control panel 3, and by-pass-line 43. The exhaust of vacuum pump 42, which for example is an oil-free membrane pump, is connected with scrubber 301 in order to recycle the carbonyls. The Reactor 101' is receiving the moiety feed 69 and first heating feed 89 through the second feed line 86 into the first distribution funnel 111' cooled by cooling liquid-in 63 and cooling liquid-out 65 located in mixing head 121'. The Reactor 101' further comprises reactor bottom 161, from where gases with nano-particles are transmitted to the second separation stage 181', the third separation stage 191' through filter 195 into scrubber 301 with cooling water in 311 and cooling water out 321, where unused metal carbonyls are recovered in a trap. The scrubber also receives metal carbonyl through by-pass line 43 and from the exhaust of vacuum pump 42. Gases from production of nano-particles are then vented through exhaust 401.

A fourth embodiment of a reaction complex 1''' with a reactor 101" is shown in FIG. 16. This version of a production complex favourably extents the production capacity to a larger variety of nano-particles of metal, in particular of nano-particles consisting of different kinds of metal also having specific morphologies discussed in the description of this invention.

The educt supply 11''' unit of this complex 1''' is therefore designed to be operated from the control panel 3', which controls at least eight three-way valves 31, 32, 33, 34, 35, 36, 37, and 38. The educt supply 11''' also comprises the first carbonyl source 13, the bearer gas source 17, the pressure control 19 and the first mixer evaporator 23 also shown in FIG. 15, which can be used in ways laid out for the embodiment of production complexes 1' and 1" in FIGS. 14 and 15 respectively. In addition the educt supply 11" of FIG. 16 comprises a second carbonyl source 15, which connects through valve 36 and through valve 37 with a second mixer evaporator 25. The third port of valve 36 is connected through a tube with the pressure control 19 for the bearer gas source 17. Valve 37 has its third port connected through a tube directly with the bearer gas source 17. The output of the first mixer evaporator 23 and the second mixer evaporator 25 are mixed in a mixer 27. From there the moiety being the first moiety feed 69 is led through the first feed line 56 including valve 32 and valve 34 into the first distribution funnel 111", which is temperature controlled by using cooling liquid-in 63 and cooling liquid-out 65 of reactor 101". Funnel 111" in mixing head 121" of reactor 101" differs from funnel 111' of reactor 101' in FIG. 11 in particular by another flask (not shown) that is inserted slightly deeper into reactor 101" of FIG. 16 than flask 71 of FIG. 11 enters into reactor 101'. This configuration of reactor 101" in FIG. 16 is of advantage in view of nano-particle interaction with gas from additional feeders (not shown).

In this embodiment of complex 1''', an optional feeding unit 41 is additionally implemented, which in some applications is used to provide a different metal organic compound to be added to the moiety in the mixer 27 connected through a conduit and three-way valve 38. The third port of this three-way valve 38 is used either to feed moiety from the mixer 27 or from the optional feeding unit 41 into the second distribution funnel 113 of reactor 101" using a third feeder (not shown). Either way is used for specific production processes by operation of valve 31, 32, 33, 34, 35, 36, 37, 38 through control panel 3. The second moiety feed 70 through the second distribution funnel 113 into reactor 101" is thermally decomposed therein.

The thermal energy for this decomposition is provided through a fourth feeder, which is connected through a conduit with heater 91' of the heating fluid supply 8'. This heater 91' is also equipped with a temperature control 93 and designed for providing three outputs of hot gas for reactor 101". The first output is the first heating feed 89 passed through the second feed line 86 into the first distribution funnel 111". The second heating is fed into the second distribution funnel 113. The first and second heating feed 89 and 90 are provided at an independently selectable temperature. A third hot gas output (not shown) is connected with the educt supply 11'" and used in particular in pre-process cleaning procedures requiring heat. The gas supply through this heater 91' comes from an inert gas source 95' and a process gas source 96'. An additional auxiliary fluid source 97 can provide another admixture to the heating gas heated with heater 91', which is required for special reactive production processes.

This embodiment of reactor 101" is also equipped with a fifth feeder entering the cylindrical body of reactor 101" sideways between the second distribution funnel 113 and reactor bottom 161. In specific operational routines a cooling feed 99 gas enters the reactor through a fifth feeder (not shown). This cooling feed 99 is provided from the inert gas source 95' through a cooler/controller 98 into the fifth feeder (not shown) and thus into reactor 101". By means of this cooling feed 99, the hot gas within the reactor is cooled down in order to stop decomposition of moiety and reduce further growth of nano-particles of metal. Therefore this cooling feed is a means to control the size of nano-particles of metal and corresponding widths of size distributions.

Venting of the first feed line 56 through by-pass-line 43' is carried out in a similar way as described for the complex 1' in FIG. 14 process a) of the pre-process cleaning. Cleaning procedure b) and cleaning procedure c) of the pre-process operation are also carried out in similar ways in complex 1'" of FIG. 16 e.g. by employing vacuum pump 42. Nevertheless there are several differences. In complex 1'" not only components used in connection with the first carbonyl source 13 but also the components used in connection with the second carbonyl source 15, and the optional feeding unit 41, in particular mixing stages 23, 25, 27 and all connecting conduits, are vented, purged or evacuated in such pre-process cleaning procedures.

Another advantageous feature of complex 1'" in FIG. 16 is the carbon oxide (CO) gas sensor unit 45, installed in the by-pass-line 43' behind valve 34. This sensor unit 45 is particularly useful during pre-process operation for controlling the flow of carbon oxide through the by-pass-line 43' into scrubber 301 and into exhaust 401 by giving a measure of the purity of residual gas extracted from the educt supply 11'" unit. Such a sensor unit is also installed in a further embodiment of the production complex (not shown) between valve 32 and valve 33 of FIG. 16. In this further embodiment the sensor unit comprises a heating wire, which is used for pulsed electrical current heating of residual gas. This gas is passing across the wire to the sensor. The heat of the wire causes decomposition of residual metal carbonyl on the wire surface releasing carbon oxide (CO), which then is detected by the sensor exposed to this flow of gas. The sensor unit furthermore comprises a sensor for the detection of residual oxygen ($O_2$) in the supply lines for moiety during pre-process operation. This installment improves purity of moiety and in this way quality of nano-particles produced and collected e.g. through the second separation stage 181' or the third separation stage 191' with filter 195". Unused carbonyl vapour is condensed in the scrubber 301 on a structure cooled with cooling water in 311 and out 321.

Examples for nano-particles of metal produced with an embodiment of a reactor and production complex of this invention are shown in Table 1. Nano-particles of Fe, Ni, Co as well as mixtures FeCo, FeNi, FeNiCo are produced under conditions listed for the heating feeder temperature and flow, for the moiety feeder carrier gas and flow and moiety carbonyl flow. The size of products obtained for each set of production conditions is listed for the first particle trap SC1, the second particle trap SC2 and the particle filter. Such fractions of nano-particles of metal are separated from the gas stream of reaction products in the first, second and third separation stage of the production complex described here. Further details that were measured with these particles are described in the column morphology.

Nano-particles are produced with less than 75 nm size. As one example from Table 1, a first fraction of nano-particles of Fe of 50 nm size, a second fraction of 20 nm size and a third fraction of less than 20 nm is collected from a production cycle of the reactor in three separation stages described in this invention. Such fractions are produced using a heating feeder temperature of 145° C. for the heating fluid flux of inert gas of 25 litres (1)/minute (min). Other conditions of this production process were the flow of an inert carrier gas, also called bearing gas through the moiety feeder of 0.060 l/min while the moiety feeder provided Fe-carbonyl flow of 0.040 g/min into the reactor. Particles obtained with these parameters were characterized as small agglomerations. Detailed sets of production parameters for the production of up to three different fractions of nano-particles of Fe, Ni, Co as well as mixtures of such metals are listed in Table 1. Typical heating feeder gas temperatures are between 140° C. and 350° C. Heating feeder gas flow was typically used between 5 and 25 l/min. The typical gas flow for the carrier gas was between 0.06 and 5.5 l/min. The metal carbonyl flow was typically between 0.05 and 2.0 g/min. Morphologies found depending on production conditions include particles, plates, dots, crystalline phase, agglomeration either small or big or in chains, meshroom like entangled nano-wires or needles.

This Table 1 is meant to illustrate the potential of the reactor and production complex, described in this invention for the production of a large variety of nano-particles of metal. Therefore, it is to be understood that Table 1 is not excluding any size or morphology of nano-particles of metal not listed therein. In addition, production parameter and size ranges, materials or morphologies of nano-particles of metal given are not representing technical limitations of the reactor and production complex of this invention.

Table 1 presents examples of nano-particles of metal produced and production parameters.

TABLE 1

| Product | Heating Feeder Temp (° C.) | Heating Feeder Flow l/min | Moiety Feeder Carrier Gas l/min | Moiety Feeder Carbonyl g/min | Size of product nm SC1 | Size of product nm SC2 | Size of product nm Filter | Morphologie SC1 | Morphologie SC2 | Morphologie Filter |
|---|---|---|---|---|---|---|---|---|---|---|
| Fe | 145 | 25 | 0.060 | 0.040 | 50 | 20 | <20 | | | Small agglomeration |
| Fe | 145 | 25 | 0.150 | 0.040 | 70 | 50 | <50 | | | Particle and plate |
| Fe | 160 | 5 | 0.500 | 0.045 | 50 | 20-10 | <10 | | | dot and big agglomeration |
| Fe | 345 | 25 | 2.000 | 0.500 | 60 | 30-20 | <20 | | | cristalline phase and agglomeration |
| Ni | 335 | 20 | 0.500 | 0.500 | 60 | 20 | <20 | | | big agglomeration |
| Ni | 335 | 20 | 0.500 | 2.000 | 20 | 10 | <10 | | | Small agglomeration |
| Ni | 100 | 5 | 0.060 | 0.100 | 45 | 35 | <35 | | | Small agglomeration |
| Co | 170 | 10 | 3.000 | 0.040 | — | — | <20 | | | Small agglomeration |
| Co | 200 | 20 | 3.000 | 0.040 | — | — | <20 | | | Small agglomeration |
| FeCo | 340 | 20 | 5.000 | 0.500 | 20 | 20-10 | <10 | | | big agglomeration |
| FeNi | 300 | 20 | 0.500 | 0.500 | 60 | 45-20 | <20 | | | cristalline phase and agglomeration |
| FeNiCo | 280 | 10 | 5.5 | 0.600 | 60 | 35 | <35 | | | Meshroom and needles |

Table 2 relates each of the components referred to in FIG. 1-FIG. 16 to its respective reference number(s).

TABLE 2

| Reference Numeral | Significance |
|---|---|
| 1, 1', 1", 1'" | production complex |
| 2 | supporting frame |
| 3, 3' | control panel |
| 6 | cooling liquid supply |
| 8, 8' | heating fluid supply |
| 11, 11', 11", 11'" | educt supply |
| 13 | first carbonyl source |
| 15 | second carbonyl source |
| 17 | bearer gas source |
| 18 | bearer fluid source |
| 19 | pressure control |
| 21 | carbonyl pump |
| 22 | bearer fluid pump |
| 23 | first mixer evaporator |
| 25 | second mixer evaporator |
| 27 | mixer |
| 31 | first valve |
| 32 | second valve |
| 33 | third valve |
| 34 | fourth valve |
| 35 | fifth valve |
| 36 | sixth valve |
| 37 | seventh valve |
| 38 | eighth valve |
| 41 | optional feeding unit |
| 42 | vacuum pump |
| 43, 43' | by-pass-line |
| 45 | gas sensor unit |
| 51, 51' | moiety injector |
| 53, 53' | moiety injector flange |
| 54, 54' | moiety injector housing |
| 55, 55' | first feeder |
| 56 | first feed line |
| 57, 57' | first conduit |
| 58, 58' | first feeder nozzle |
| 61, 61' | injector cooling bath |
| 63 | cooling liquid-in |
| 65 | cooling liquid-out |
| 69 | first moiety feed |
| 70 | second moiety feed |
| 71 | flask |
| 73 | flask diameter |
| 75 | reception hole |
| 77 | insertion depth |
| 78 | seat of flask |
| 79 | flange of seating flask and reception hole |
| 80 | hot-gas injector |
| 81 | hot-gas guiding plate |
| 82 | hot-gas guiding slot |

TABLE 2-continued

| Reference Numeral | Significance |
|---|---|
| 83 | guiding plate aperture |
| 84 | hot-gas injector housing and flanges |
| 85 | second feeder |
| 86 | second feed line |
| 87 | second feeder conduit |
| 88 | second feeder conduit end |
| 89 | first heating feed |
| 90 | second heating feed |
| 91, 91' | heater |
| 93 | temperature control |
| 95, 95' | inert gas source |
| 96, 96' | process gas source |
| 97 | auxiliary fluid source |
| 98 | cooler/controller |
| 99 | cooling feed |
| 101, 101', 101" | reactor |
| 111, 111', 111" | first distribution funnel |
| 113 | second distribution funnel |
| 121, 121', 121" | mixing head |
| 131, 131' | dissociation chamber |
| 141, 141' | decomposition zone |
| 145, 145' | sprawled reactor body |
| 151, 151' | precipitation zone |
| 161, 161' | reactor bottom |
| 163, 163' | reactor flange |
| 165, 165' | trap flange |
| 171 | first separation stage |
| 173 | first particle trap |
| 175, 175' | collecting wall |
| 177, 177' | collecting tube |
| 178 | gas extraction valve |
| 179 | exit conduit |
| 181, 181' | second separation stage |
| 183 | second particle trap |
| 185 | reception conduit |
| 187 | flow-body |
| 189 | exit flange |
| 191, 191' | third separation stage |
| 195, 195', 195" | particle filter |
| 201 | safety wash bottle |
| 301 | scrubber |
| 311 | cooling water in |
| 321 | cooling water out |
| 401 | exhaust |

What is claimed is:

1. A reactor comprising:
   at least a first feeder and a second feeder on one end of the reactor;
   wherein the reactor is a through-flow reactor designed for producing nano-particles of metal from volatile moieties;

wherein the first feeder is a moiety feeder for an educt fluid by which volatile moieties carried in a bearing gas enter the reactor;

wherein the second feeder is a radiator means for a heating fluid by which the ambient temperature for a dissociation of the metal moieties is controlled;

wherein the reactor ends with at least three separation stages to separate different sizes of nano-particles, and the first feeder is a seating flask with an outer diameter which is seated in a reception hole of a smaller side of the reactor with an insertion depth, the insertion depth being adjusted by an adjustable relative position between the seating flask and the reception hole.

2. The reactor in accordance with claim 1, wherein the radiator means for a heating fluid is a radiator means for a heated gas.

3. The reactor in accordance with claim 2, wherein the second feeder is configured to feed the heated gas into the reactor in multiple quantities of a flow of the educt fluid.

4. The reactor in accordance with claim 2, further comprising a temperature control arrangement connected to the second feeder.

5. The reactor in accordance with claim 2, wherein the radiator means for the heated gas comprises a radiator means for an inert gas.

6. The reactor in accordance with claim 5, wherein the inert gas is one of dinitrogen or a noble gas.

7. The reactor in accordance with claim 1, wherein the reactor is an elongated sprawled reactor, further comprising a mixing head, a decomposition zone, a precipitation zone, an exit conduit, and at least one collecting tube, configured such that in the mixing head the educt fluid impinges on the heating fluid and both fluids, the educt fluid and the heating fluid, travel to the decomposition zone.

8. The reactor in accordance with claim 7, wherein the reactor is tube-like.

9. The reactor in accordance with claim 1, wherein the reactor has at least one collecting wall configured to collect nano-particles of a minimum dimension by settling the nano-particles on the collecting wall.

10. The reactor in accordance with claim 9, wherein a precipitation zone is encircled at least partially by the collecting wall, the collecting tube is configured to collect metal nano-particles of a minimum weight and the exit conduit is configured to discharge carbon monoxide bearing metal nano-particles of smaller weight than the minimum weight.

11. The reactor in accordance with claim 10, wherein the collecting wall disembogues into at least one collecting tube, which is situated flow-downward from the exit conduit.

12. The reactor in accordance with claim 1, wherein the at least three separation stages comprise: a first stage by which nano-particles of a dimension less than 100 nm are separated from an exit conduit.

13. The reactor in accordance with claim 12, wherein the reactor comprises a second stage by which nano- particles of a dimension less than a limit in a range of 20 nm to 50 nm are separated from the exit conduit.

14. The reactor in accordance with claim 13, wherein the reactor comprises a third stage by which nano-particles of smaller dimensions than in the second stage are collected.

15. The reactor in accordance with claim 1, wherein the first feeder and the second feeder are oriented towards a same zone in the reactor but building a sharp angle between a nozzle of the first feeder and an end of a conduit of the second feeder.

16. The reactor in accordance with claim 1, wherein the second feeder ends in a distribution funnel which supports a circular movement of the heating fluid when fed into the reactor.

17. The reactor in accordance with claim 16, wherein the distribution funnel directs the heating fluid including a moiety in a first orientation in a circular movement in a plane perpendicular to a central axis of the reactor, or in a second orientation in a plane parallel to a central axis of the reactor.

18. The reactor in accordance with claim 1, wherein the first feeder is a permanently cooled feeder.

19. The reactor in accordance with claim 18, wherein the permanently cooled feeder is configured to be cooled by a cooling liquid.

20. The reactor in accordance with claim 19, wherein the cooling liquid is a cooling oil.

21. The reactor in accordance with claim 19, wherein the reactor is configured to have the cooling liquid bathe a surface of a nozzle of the first feeder.

22. The reactor in accordance with claim 1, wherein the first feeder is configured to be supplied by a pre-mixed stream with moieties comprising admixed carbonyls.

23. The reactor in accordance with claim 1, wherein the first feeder of said reactor comprises:
a first cross-section of a conduit for moiety supply; and
a feeder extension with a second cross-section located inside the reactor.

24. The reactor in accordance with claim 23, wherein the second cross-section is located inside a dissociation chamber of the reactor.

25. The reactor in accordance with claim 23, wherein the second cross section is smaller than the first cross-section.

26. The reactor in accordance with claim 1, wherein the second feeder of the reactor comprises a conduit comprising a first cross-section for the heating fluid supply connected to a beginning of a feeder extension with a second cross-section which is open on one side, the feeder extension being located inside the reactor.

27. The reactor in accordance with claim 26, wherein the second cross-section is one of the shape of a letter "U" or a letter "V".

28. The reactor in accordance with claim 26, wherein an end of the feeder extension is bent circularly towards the beginning of the feeder extension and the feeder extension is connected to an opening of the conduit.

29. The reactor in accordance with claim 26, wherein the feeder extension is facing the first feeder of the reactor.

30. The reactor in accordance with claim 1, wherein the second feeder comprises a guiding plate having an aperture.

31. The reactor in accordance with claim 30, wherein the guiding plate is disposed around the first feeder.

32. The reactor in accordance with claim 1, wherein the first feeder is a seating flask with an outer diameter which is seated in a reception hole of a smaller side of the reactor with an insertion depth, the insertion depth being adjusted by an adjustable relative position between a flange of the seating flask and the reception hole.

33. The reactor in accordance with claim 32, wherein the insertion depth is adjustable by the flange of the seating flask.

34. The reactor in accordance with claim 1, wherein the first feeder is configured to be supplied by a pre-mixed stream with moieties including metal carbonyls.

35. The reactor in accordance with claim 1, wherein the seating flask is a glass flask.

36. The reactor in accordance with claim 1, wherein the first feeder is configured to be supplied by a pre-mixed stream with moieties including metal complexes.

37. The reactor in accordance with claim 1, wherein the first feeder is configured to be supplied by a pre-mixed stream with moieties including organometallic compounds.

38. The reactor in accordance with claim 1, wherein the first feeder is configured to be supplied by a pre-mixed stream with moieties including metal coordination compounds.

39. A reactor comprising:
at least a first feeder and a second feeder on one end of the reactor;
wherein the reactor is a through-flow reactor designed for producing nano-particles of metal from volatile moieties;
wherein the first feeder is a moiety feeder for an educt fluid by which volatile moieties carried in a bearing gas enter the reactor;
wherein the second feeder is a radiator means for a heating fluid by which the ambient temperature for a dissociation of the metal moieties is controlled; and
wherein the first feeder is a seating flask with an outer diameter which is seated in a reception hole of a smaller side of the reactor with an insertion depth, the insertion depth being adjusted by an adjustable relative position between the seating flask and the reception hole.

40. The reactor in accordance with claim 39, wherein the second feeder includes a guiding plate having an aperture, and wherein the guiding plate is disposed around the first feeder.

41. The reactor in accordance with claim 39, wherein the second feeder of the reactor includes a conduit having a first cross-section for the heating fluid supply connected to a beginning of a feeder extension with a second cross-section which is open on one side, the feeder extension being located inside the reactor, and wherein the feeder extension is facing the first feeder of the reactor.

42. A reactor comprising:
at least a first feeder and a second feeder on one end of the reactor;
wherein the reactor is a through-flow reactor designed for producing nano-particles of metal from volatile moieties;
wherein the first feeder is a moiety feeder for an educt fluid by which volatile moieties carried in a bearing gas enter the reactor;
wherein the second feeder is a radiator means for a heating fluid by which an ambient temperature for a dissociation of the metal moieties is controlled; and
wherein the second feeder ends in a distribution funnel which supports a circular movement of the heating fluid when fed into the reactor.

43. The reactor in accordance with claim 42, wherein the first feeder is a seating flask with an outer diameter which is seated in a reception hole of a smaller side of the reactor with an insertion depth, the insertion depth being adjusted by an adjustable relative position between a nozzle of the first feeder and the reception hole.

44. The reactor in accordance with claim 42, wherein the reactor ends with at least three separation stages to separate different sizes of nano-particles, including a first stage by which nano-particles of a dimension less than 100 nm are separated from an exit conduit, and including a second stage by which nano-particles of a dimension less than a limit in a range of 20 nm to 50 nm are separated from the exit conduit.

45. The reactor in accordance with claim 44, wherein the reactor includes a third stage by which nano-particles of smaller dimensions than in the second stage are collected.

46. A reactor comprising:
at least a first feeder and a second feeder on one end of the reactor;
wherein the reactor is a through-flow reactor designed for producing nano-particles of metal from volatile moieties;
wherein the first feeder is a moiety feeder for an educt fluid by which volatile moieties carried in a bearing gas enter the reactor;
wherein the second feeder is a radiator means for a heating fluid by which an ambient temperature for a dissociation of the metal moieties is controlled; and
wherein a distribution funnel directs the heating fluid including a moiety in a first orientation in a circular movement in a plane perpendicular to a central axis of the reactor, or in a second orientation in a plane parallel to a central axis of the reactor.

* * * * *